US012671506B2

(12) United States Patent
Chen et al.

(10) Patent No.: US 12,671,506 B2
(45) Date of Patent: Jun. 30, 2026

(54) METHODS, SYSTEMS, AND APPARATUSES FOR MANAGING A WIRELESS NETWORK

(71) Applicant: COMCAST CABLE COMMUNICATIONS, LLC, Philadelphia, PA (US)

(72) Inventors: Tianwen Chen, McLean, VA (US); Hongcheng Wang, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 793 days.

(21) Appl. No.: 16/774,995

(22) Filed: Jan. 28, 2020

(65) Prior Publication Data
US 2021/0235293 A1 Jul. 29, 2021

(51) Int. Cl.
| | |
|---|---|
| *H04B 17/391* | (2015.01) |
| *G06N 5/04* | (2023.01) |
| *G06N 20/00* | (2019.01) |
| *H04B 17/318* | (2015.01) |
| *H04W 16/18* | (2009.01) |
| *H04W 24/02* | (2009.01) |
| *H04W 24/08* | (2009.01) |

(52) U.S. Cl.
CPC ............. *H04B 17/391* (2015.01); *G06N 5/04* (2013.01); *G06N 20/00* (2019.01); *H04B 17/318* (2015.01); *H04W 16/18* (2013.01); *H04W 24/02* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 9,763,252 B2 | 9/2017 | Kilpatrick, II et al. | |
| 10,284,299 B2 * | 5/2019 | Vardarajan | ......... H04B 7/15507 |
| 10,887,781 B2 * | 1/2021 | Pandey | ................... H04L 41/16 |
| 11,537,896 B2 * | 12/2022 | Choi | ...................... G06N 3/048 |
| 11,540,148 B2 * | 12/2022 | Stafford | ................ H04W 16/20 |

(Continued)

FOREIGN PATENT DOCUMENTS

CN 103532647 A 1/2014

OTHER PUBLICATIONS

Perneda et al., "Self-X Design of Wireless Networks: Exploiting Artificial Intelligence and Guided Learning", 2018 (14 pages).

(Continued)

*Primary Examiner* — Chirag G Shah
*Assistant Examiner* — Suk Jin Kang
(74) *Attorney, Agent, or Firm* — Ballard Spahr LLP

(57) ABSTRACT

Methods, systems, and apparatuses for managing a wireless network are described herein. A wireless network may include a gateway device, an access point, and a group of client devices. An analytics engine may receive network performance data for the wireless network, which may indicate network telemetry data for each of the client devices or associated locations during a time period. The analytics engine may utilize a trained classifier to determine that a performance metric indicated by the network performance data for a client device falls below a desired level of performance. The analytics engine may provide a recommendation regarding an addition or placement of a network device in order to improve the performance metric.

20 Claims, 15 Drawing Sheets

(56)                References Cited

U.S. PATENT DOCUMENTS

| | | | | |
|---|---|---|---|---|
| 2014/0022918 A1* | 1/2014 | Guo | H04W 48/20 |
| | | | 370/252 |
| 2015/0236800 A1* | 8/2015 | Tipton | H04W 72/02 |
| | | | 370/252 |
| 2015/0341211 A1* | 11/2015 | Saha | H04W 88/08 |
| | | | 709/221 |
| 2015/0365833 A1* | 12/2015 | Stafford | H04W 24/02 |
| | | | 370/252 |
| 2015/0373562 A1* | 12/2015 | Wirola | G01S 5/0252 |
| | | | 370/338 |
| 2016/0302079 A1* | 10/2016 | Chari | H04W 24/08 |
| 2016/0302096 A1* | 10/2016 | Chari | H04W 40/12 |
| 2016/0373306 A1* | 12/2016 | Saha | H04W 24/08 |
| 2017/0353245 A1* | 12/2017 | Vardarajan | H04W 16/20 |
| 2018/0103408 A1* | 4/2018 | Amini | H04W 16/26 |
| 2018/0249406 A1* | 8/2018 | Tellado | H04W 48/20 |
| 2019/0036789 A1* | 1/2019 | Kaplunov | H04L 41/16 |
| 2019/0116485 A1 | 4/2019 | Vasseur et al. | |
| 2019/0150002 A1* | 5/2019 | Ligata | H04W 16/26 |
| | | | 370/329 |
| 2019/0215074 A1* | 7/2019 | Vardarajan | H04B 10/2939 |
| 2019/0239100 A1* | 8/2019 | Pandey | H04W 36/08 |
| 2019/0306023 A1* | 10/2019 | Vasseur | H04L 41/16 |
| 2019/0362237 A1* | 11/2019 | Choi | G06N 3/088 |
| 2019/0364380 A1* | 11/2019 | Khawand | H04W 4/02 |
| 2019/0373464 A1* | 12/2019 | Chari | H04W 4/00 |
| 2019/0387415 A1* | 12/2019 | Scahill | H04W 24/02 |
| 2020/0037233 A1* | 1/2020 | Taneja | G06N 20/10 |
| 2020/0127745 A1* | 4/2020 | Lu | H04B 17/102 |
| 2020/0187023 A1* | 6/2020 | Hwang | H04W 24/10 |
| 2020/0305111 A1* | 9/2020 | Kuang | H04W 24/08 |
| 2021/0006984 A1* | 1/2021 | Keaton | H04W 24/02 |
| 2021/0007046 A1* | 1/2021 | Tellado | H04W 24/02 |
| 2021/0092611 A1* | 3/2021 | Pasricha | G01S 5/0215 |
| 2021/0097387 A1* | 4/2021 | Chidlovskii | G06N 3/088 |
| 2021/0120438 A1* | 4/2021 | Pandey | H04W 24/04 |
| 2021/0224687 A1* | 7/2021 | Goldszmidt | G06K 9/6262 |
| 2021/0273852 A1* | 9/2021 | Horne | H04W 24/02 |
| 2021/0367691 A1* | 11/2021 | Miyatake | H04B 17/27 |
| 2022/0007146 A1* | 1/2022 | Carbonnel | H04B 17/27 |
| 2023/0034527 A1* | 2/2023 | Keaton | H04W 24/10 |
| 2024/0155365 A1* | 5/2024 | Keaton | H04B 17/318 |

OTHER PUBLICATIONS

Perneda et al., "Artificial Intelligence Inspired Self-Deployment of Wireless Networks" 2018 (15 pages).

* cited by examiner

FIG. 2
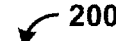
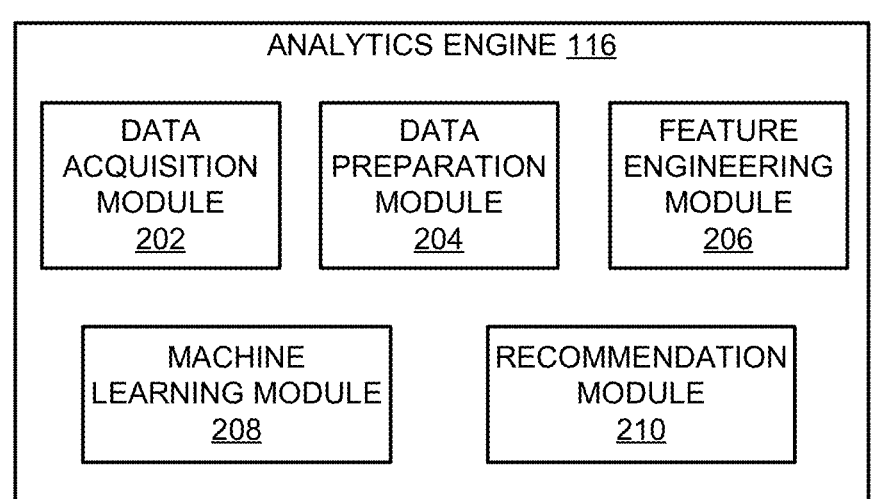

800

| Feature | Coef |
|---|---|
| num_device_5g | 0.459205 |
| num_device_2g | 0.429651 |
| tx_rssi_lower_25_5g | 0.372459 |
| tx_rssi_lower_25_2g | 0.272162 |
| rssi_std_2g | 0.033454 |
| num_switch_device | 0 |
| rssi_skew_5g | -0.066183 |
| rssi_std_5g | -0.086799 |
| rx_rssi_lower_25_5g | -0.111596 |
| rssi_skew_2g | -0.12748 |
| rx_rssi_lower_25_2g | -0.275728 |
| rssi_lower_25_2g | -0.605132 |
| rssi_lower_25_5g | -0.803694 |

RECEIVE NETWORK PERFORMANCE DATA ASSOCIATED WITH A
PLURALITY OF WIRELESS NETWORKS

1204

DETERMINE A FIRST TRAINING DATASET

1206

DETERMINE A SECOND TRAINING DATASET

1208

TRAIN A CLASSIFIER USING THE FIRST TRAINING DATASET
AND THE SECOND TRAINING DATASET

1300

1302
RECEIVE NETWORK PERFORMANCE DATA ASSOCIATED WITH AT LEAST ONE CLIENT DEVICE

1304
DETERMINE A PERFORMANCE METRIC FOR THE AT LEAST ONE CLIENT DEVICE

1306
DETERMINE THAT A VALUE FOR THE PERFORMANCE METRIC DURING AT LEAST ONE TIME INTERVAL IS BELOW A THRESHOLD

1308
DETERMINE A RECOMMENDATION FOR PLACEMENT OF A NETWORK DEVICE

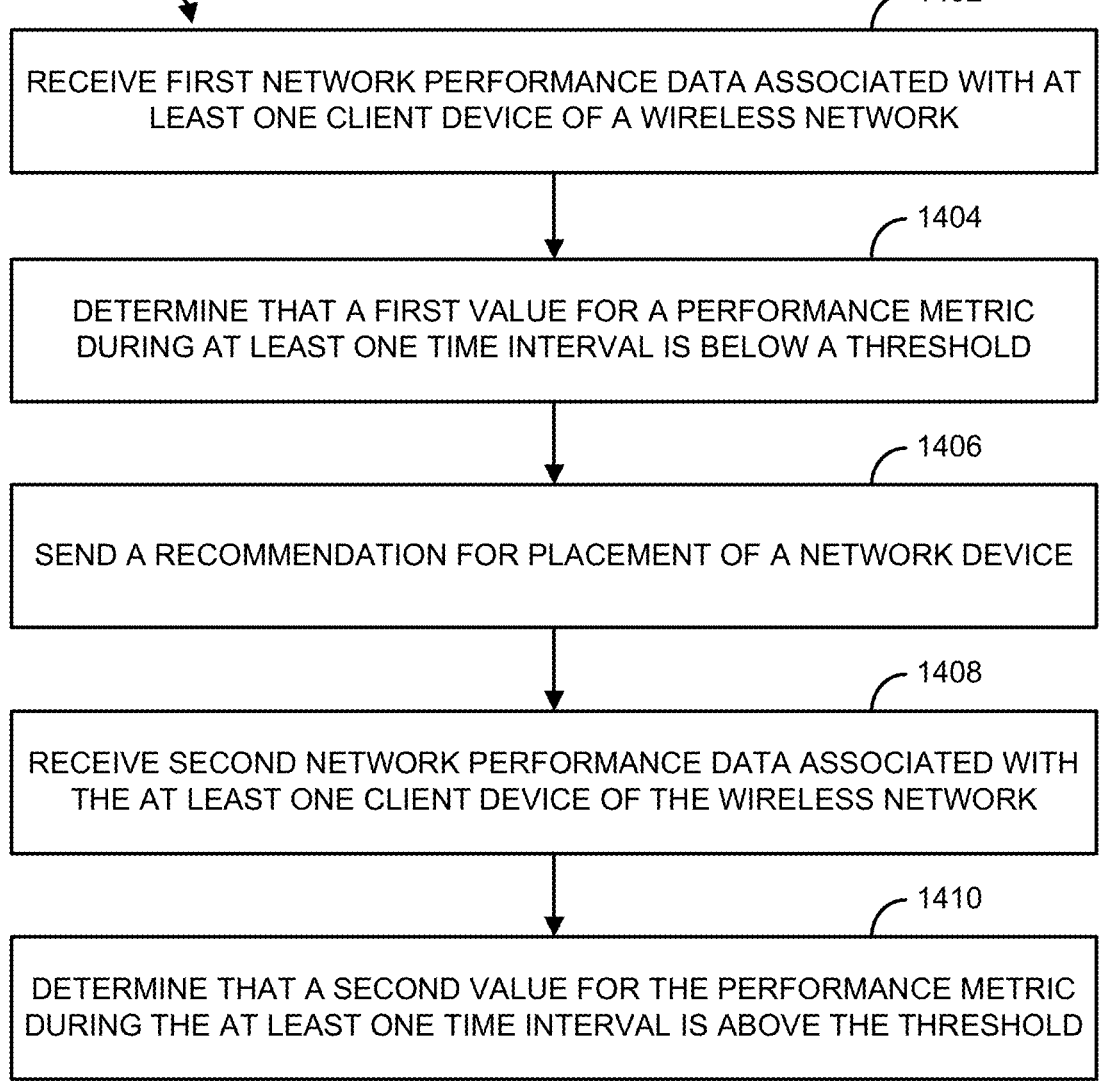

RECEIVE FIRST NETWORK PERFORMANCE DATA ASSOCIATED WITH AT LEAST ONE CLIENT DEVICE OF A WIRELESS NETWORK

1404

DETERMINE THAT A FIRST VALUE FOR A PERFORMANCE METRIC DURING AT LEAST ONE TIME INTERVAL IS BELOW A THRESHOLD

1406

SEND A RECOMMENDATION FOR PLACEMENT OF A NETWORK DEVICE

1408

RECEIVE SECOND NETWORK PERFORMANCE DATA ASSOCIATED WITH THE AT LEAST ONE CLIENT DEVICE OF THE WIRELESS NETWORK

1410

DETERMINE THAT A SECOND VALUE FOR THE PERFORMANCE METRIC DURING THE AT LEAST ONE TIME INTERVAL IS ABOVE THE THRESHOLD

METHODS, SYSTEMS, AND APPARATUSES FOR MANAGING A WIRELESS NETWORK

BACKGROUND

Network coverage within a home, multi-dwelling unit, or enterprise may be inconsistent, especially for client devices of the network that are mobile rather than stationary. For example, a wireless signal received by a client device from a gateway or access point may vary throughout a coverage area as the client device changes location, thereby causing data retransmission leading to bandwidth consumption and/ or poor signal strength. To improve overall network performance for client devices, existing solutions encompass adding additional access points to the network; however, these existing solutions fail to consider how signal strength for a client device changes with time. As a result, these existing solutions often recommend incorrect and/or inefficient placement of the additional access points. These and other considerations are addressed by the present description.

SUMMARY

It is to be understood that both the following general description and the following detailed description are exemplary and explanatory only and are not restrictive. Methods, systems, and apparatuses for managing a wireless network are described herein. A wireless network may include a gateway device, an access point, and a group of client devices. One or more of the client devices may be mobile, while other client devices may be stationary. An analytics engine may receive network performance data for the wireless network, which may indicate a level of signal strength, as well as other network telemetry data, experienced by each of the client devices throughout a time period, such as a week. The analytics engine may use the network performance data to determine a performance metric for each client device for a given time interval, such as an hour of a day.

The performance metric for a given client device, or associated premise location, may relate to its level of signal strength and an amount of traffic it processed during the time interval. Using data analysis, such as machine learning techniques, the analytics engine may determine and utilize a trained classifier to determine whether the performance metric falls below a desired level of performance, such as a performance threshold. The analytics engine may also determine whether the client device is mobile or stationary. The analytics engine may provide a recommendation regarding an addition and placement of a new network device, or a new placement of an existing network device (e.g., a Wi-Fi repeater, a Wi-Fi router, and the like), in order to improve the level of signal strength or other performance criteria experienced by the client devices. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 2 shows a block diagram of an example system module;
FIG. 8 shows an example table;
FIG. 14 shows an example method.

DETAILED DESCRIPTION

Figure 1:
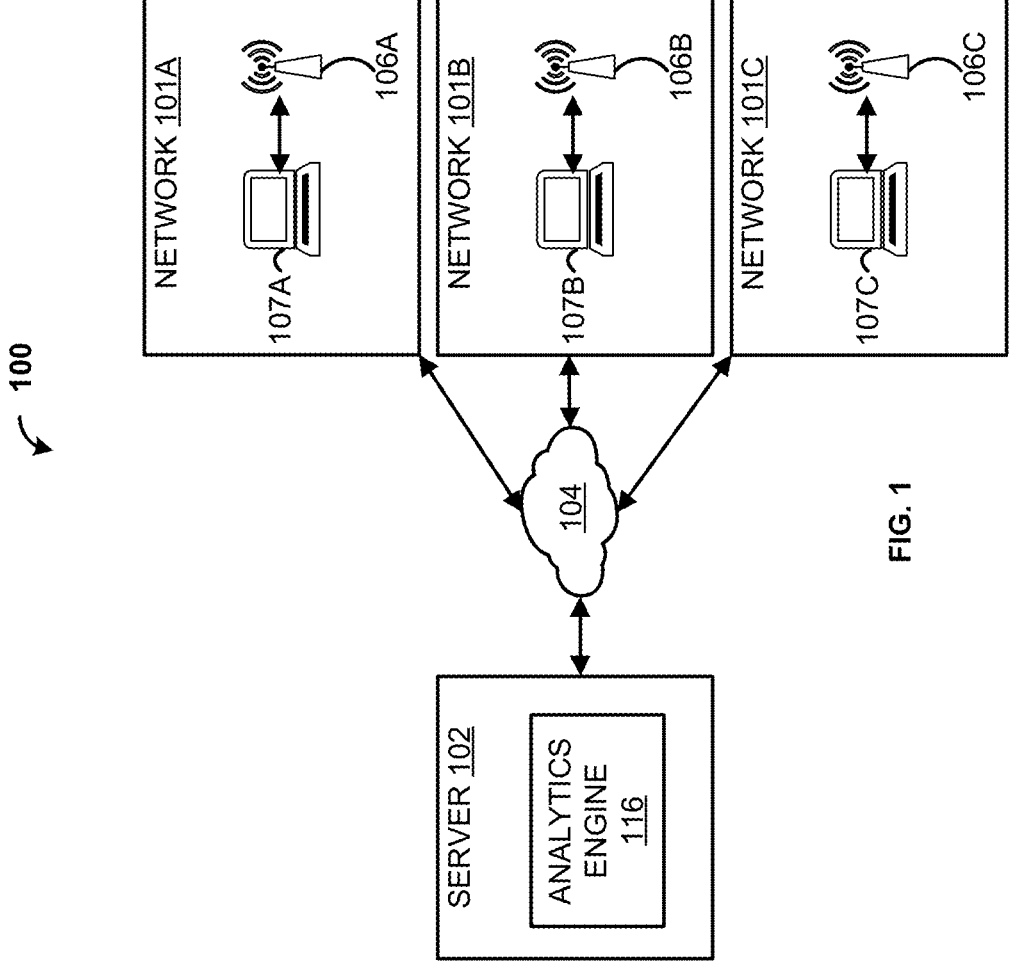
FIG. 1 shows a block diagram of an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for managing wireless networks are described herein. A wireless network may comprise a gateway device, an access point, and a group of client devices. An analytics engine may be used to manage the wireless network and optimize network service for the group of client devices. The analytics engine may assist a network operator and/or a user of a client device with placement of a network device, such as a wireless network extender, repeater, access point, etc., at a position that extends a coverage area of the gateway device. The analytics engine may account for movement of the client device, as well as for varying levels of network traffic processed by the client device throughout a period of use, when determining whether placement of the network device is recommended. The analytics engine may provide recommendations for optimal placement of the network device using historical network performance data for the wireless network in conjunction with a trained classifier.

The analytics engine may collect/aggregate network performance data for the wireless network for a period of time, such as a day or a week. The network performance data may include telemetry data for each client device. The analytics engine may use the network performance data to determine one or more performance metrics for each client device for a given time interval, such as an hour of a day. The analytics engine may use the trained classifier and a machine learning model to determine whether addition and/or placement of the network device would improve overall network performance for at least one client device. In making this determination, the analytics engine may determine whether any of the one or more performance metrics meet or exceed a desired level of performance, such as a performance threshold. Not meeting or exceeding the desired level of performance may be indicative of network performance for the at least one client device that could be improved by adding the network device to the wireless network.

When the analytics engine determines that placement of the network device is recommended, a recommendation module may assist the network operator and/or the user with placement of the network device via a recommendation. The recommendation may indicate an identifier for the at least one client device. The recommendation may also include an indication of a probability of poor reception experienced by the at least one client device during one or more intervals of time throughout the day.

Turning now to FIG. 1, a block diagram of an example system 100 for managing network a wireless network is shown. The system 100 may include a server 102 and a plurality of wireless networks 101A, 101B, 101C each in communication with the server 102 via a network 104. The server 102 may include an analytics engine 116. Each of the plurality of wireless networks 101A, 101B, 101C may include at least one gateway device 106A, 106B, 106C (e.g., a router, access point, etc.) and at least one computing device 107A, 107B, 107C (e.g., mobile device, laptop, desktop, etc.).

The analytics engine 116 may be used to manage the plurality of wireless networks 101A, 101B, 101C and to optimize network service for at least one of the computing devices 107A, 107B, 107C. The analytics engine 116 may assist a network operator and/or a user of the at least one computing device 107A, 107B, 107C with placement of an additional network device, such as a wireless network extender, repeater, access point, etc., at a position that extends a coverage area of the gateway device 106A, 106B, 106C with respect to the at least one computing device 107A, 107B, 107C. The analytics engine 116 may collect/aggregate network performance data related to each of the plurality of wireless networks 101A, 101B, 101C for a period of time, such as a day or a week. As discussed further herein, the network performance data may include telemetry data for each of the computing devices 107A, 107B, 107C. The analytics engine 116 may use the network performance data to determine one or more performance metrics for each of the computing devices 107A, 107B, 107C for a given time interval, such as an hour of a day. As discussed further herein, the analytics engine 116 may use a trained classifier and a machine learning model to determine whether placement of an additional network device would improve overall network performance for the at least one computing device 107A, 107B, 107C. For example, the analytics engine 116 may use network performance data (e.g., telemetry data) associated with the plurality of wireless networks 101A, 101B, 101C to train the classifier, and the trained classifier may be used to determine whether placement of the network device would benefit the at least one computing device 107A, 107B, 107C.

When the analytics engine 116 determines that placement of an additional network device is recommended, a recommendation module may assist the network operator and/or the user with placement of the additional network device via a recommendation. The recommendation may be provided to the at least one computing device 107A, 107B, 107C. The recommendation may indicate an identifier for the at least one computing device 107A, 107B, 107C. The recommendation may also include an indication of a probability of poor reception experienced by the at least one computing device 107A, 107B, 107C during one or more intervals of time throughout the day.

FIG. 2 shows an expanded block diagram of the analytics engine 116 of FIG. 1. The analytics engine 116 may be used to manage a wireless network, such as any of the plurality of wireless networks 101A, 101B, 101C, and to optimize network service for associated client devices. While the following description of the analytics engine 116 may describe only one client device for ease of explanation, it is to be understood that the functionality of the analytics engine 116 and its implementation of the methods described herein may apply to a plurality of client devices in communication with a wireless network, such as each of the computing devices 107A, 107B, 107C. The analytics engine 116 may implement the methods described herein to improve a level of signal strength that a client device of the wireless network experiences during one or more intervals throughout a period of use, such as one or more hours of a given day. The analytics engine 116 may assist a network operator and/or a user of the client device (e.g., via a recommendation presented at the client device) with placement of the additional network device, such as a wireless network extender, repeater, access point, etc., at a position that extends a coverage area of a gateway device through which the client device communicates with outside networks, such as the Internet.

Figure 3:
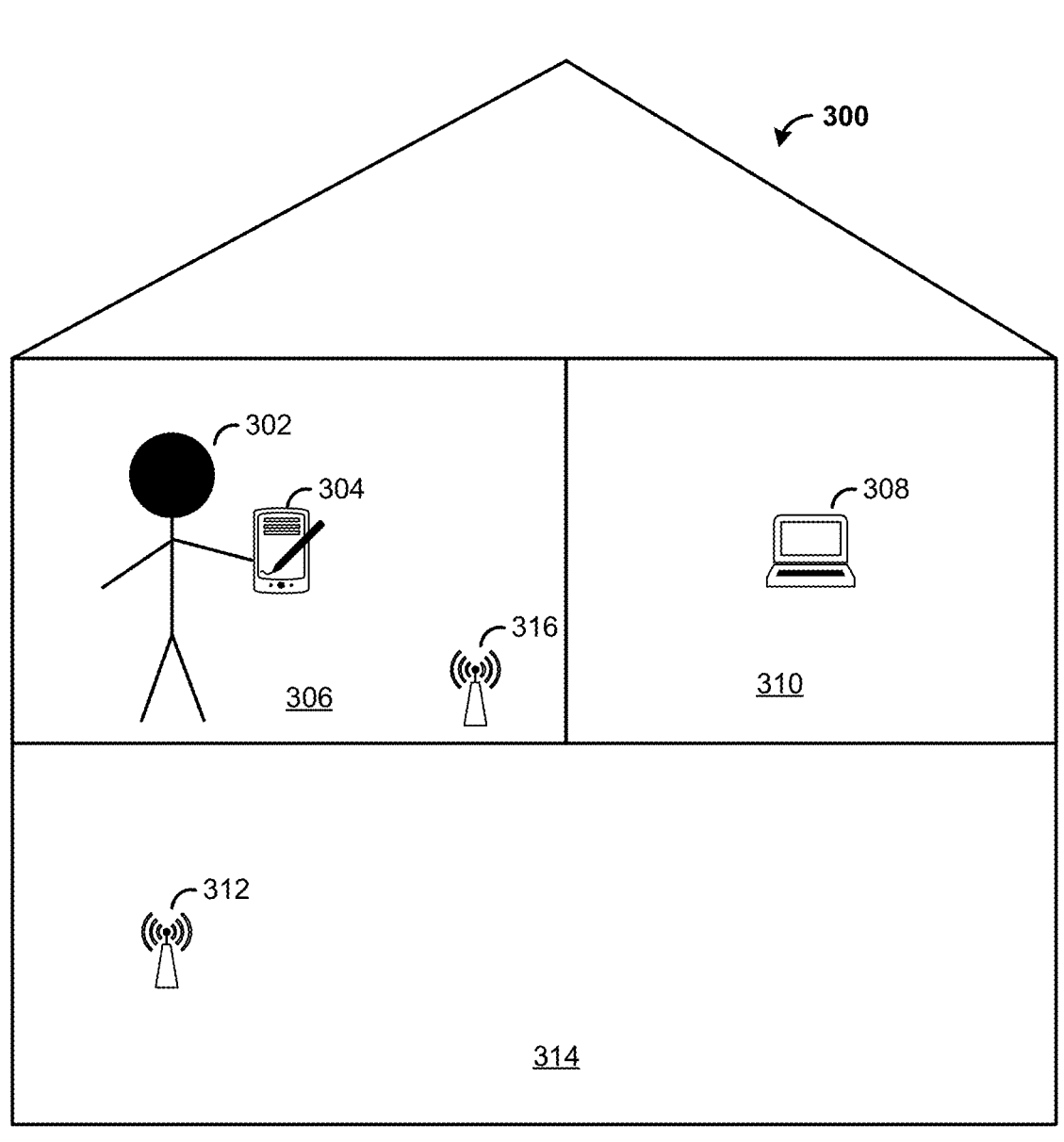
FIG. 3 shows an example operating environment.

The analytics engine 116 may account for movement of the client device, as well as for varying levels of network traffic processed by the client device throughout a period of use, to ensure placement of the network device maximizes an overall quality of service experienced by the client device throughout the period of use. For example, FIG. 3 shows an operating environment, such as a multi-level house 300. An access point 312 for a wireless network may be located in a bottom level 314 of the house. The access point 312 may provide network access for a user 302 of a mobile device 304 located in a first room 306 of the house and for a stationary device 308 (e.g., a media player) located in a second room 310 of the house. The analytics engine 116 may receive network performance data associated with the wireless network (e.g., collected by the access point 312). The analytics engine 116 may determine a probability of poor reception for the mobile device 304 during a plurality of time intervals throughout a day as the user 302 and the mobile device 304 move within the house. The probability of poor reception may vary with respect to time throughout the day. The varying probability of poor reception may correspond to movement of the mobile device 304 with respect to the access point 312; a source(s) of interference; a combination thereof, and/or the like. The analytics engine 116 may determine that the mobile device 304 is located in the first room 306 for a majority of time throughout the day that corresponds to high levels of use (e.g., network traffic). The analytics engine 116 may determine that a probability of poor reception for the stationary device 308 may not vary with respect to time throughout the day by any significant degree (e.g., it may experience a consistently high probability of poor reception due to fixed location). The analytics engine 116 may use the varying probability of poor reception for the mobile device 304 in conjunction with determined levels of network traffic processed by the mobile device 304 and/or the stationary device 308 throughout a period of use to provide a recommendation that a network device 316, such as a wireless range extender, be placed proximate to the stationary device 308 and the first room 306 (e.g., a location corresponding to highest levels of use of the mobile device 304).

The analytics engine 116 may provide recommendations for optimal placement of the network device using historical network performance data for the wireless network in conjunction with a trained classifier, as discussed further herein. For example, the analytics engine 116 may use network performance data associated with the plurality of wireless networks 101A, 101B, 101C to train the classifier, and the trained classifier may be used to determine whether placement of the network device would benefit one or more of the plurality of wireless networks 101A, 101B, 101C.

Figure 4:
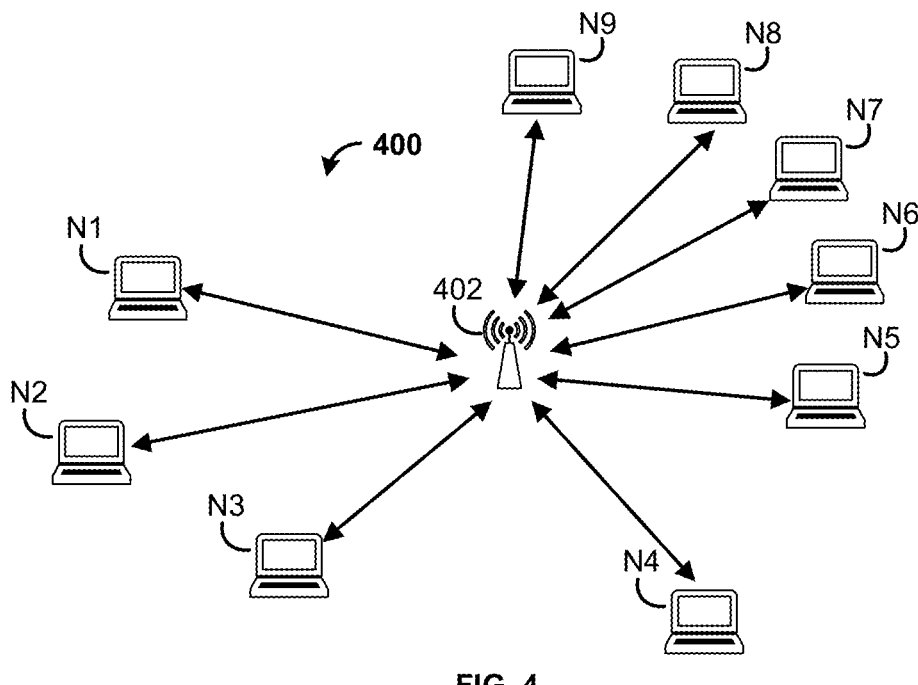
FIG. 4 shows a block diagram of an example system.

The analytics engine 116 may include a data acquisition module 202 that may be configured to collect/aggregate the network performance data for the plurality of wireless networks 101A, 101B, 101C, such as a wireless network 400 as shown in FIG. 4. The wireless network 400 may include a gateway device 402 as well as a plurality of client devices N1-N9. The network performance data for the wireless network 400 may include telemetry data such as download/upload byte counts, physical layer transmission bit rate, receive bit rate, Received Signal Strength Indicator (RSSI), and so forth for each of the plurality of client devices N1-N9. The data acquisition module 202 may associate each piece of collected/aggregated network performance data with each respective Media Access Control ("MAC") address of each of the plurality of client devices N1-N9. The data acquisition module 202 may associate each piece of collected/aggregated network performance data with a timestamp (e.g., a date and time). The data acquisition module 202 may collect/aggregate the network performance data periodically. For example, the data acquisition module 202 may determine a quantity of data (e.g., a quantity of bytes) downloaded and/or uploaded (e.g., processed) by each of the plurality of client devices N1-N9 during a period of time (e.g., an hour, a day, a week, etc.). That is, the analytics engine 116 may determine the quantity of data during the period by determining the quantity of data sent/received at given intervals of time (e.g., each minute, each hour, each day, etc.).

Figure 5A:
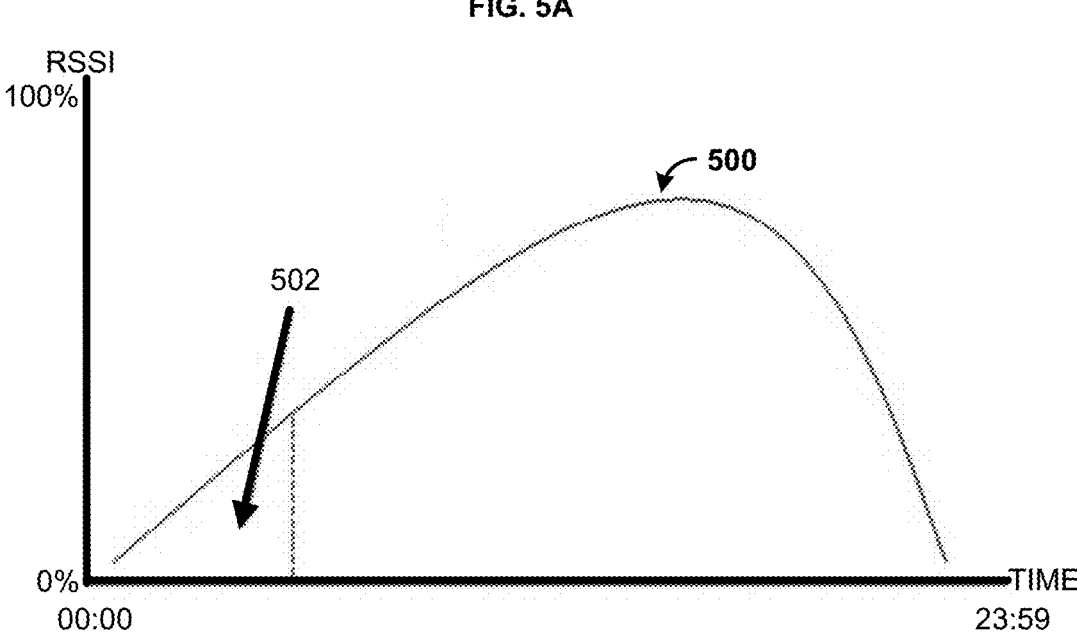
FIGS. 5A and 5B show an example line graphs.

The analytics engine 116 may use the network performance data to determine one or more performance metrics for each of the plurality of client devices N1-N9 for a given time interval, such as a day. The data acquisition module 202 may be configured to determine a distribution of each of the one or more performance metrics. An example distribution 500 of values of a performance metric for a client device of the wireless network 400 for a day is shown in FIG. 5A. As FIG. 5A indicates, the performance metric may be a level of RSSI for the client device. The level of RSSI for the client device may vary with respect to time throughout the day. The varying level of RSSI may correspond to movement of the client device with respect to the gateway device 402; source(s) of interference; an access point of the wireless network 400; a combination thereof, and/or the like. Alternatively, or in addition, the level of RSSI for the client device may not vary with respect to time throughout the day by any significant degree. For example, the client device may be a stationary device (e.g., a set-top box, media player, etc.), and the level of RSSI may remain relatively static (e.g., constant) throughout the day. The distribution 500 of the values of the performance metric for the client device may include a period of time 502 identified by the analytics engine 116 via the data acquisition module 202 as being associated with lowest average level of RSSI for the client device during a portion of the day.

Figure 5B:
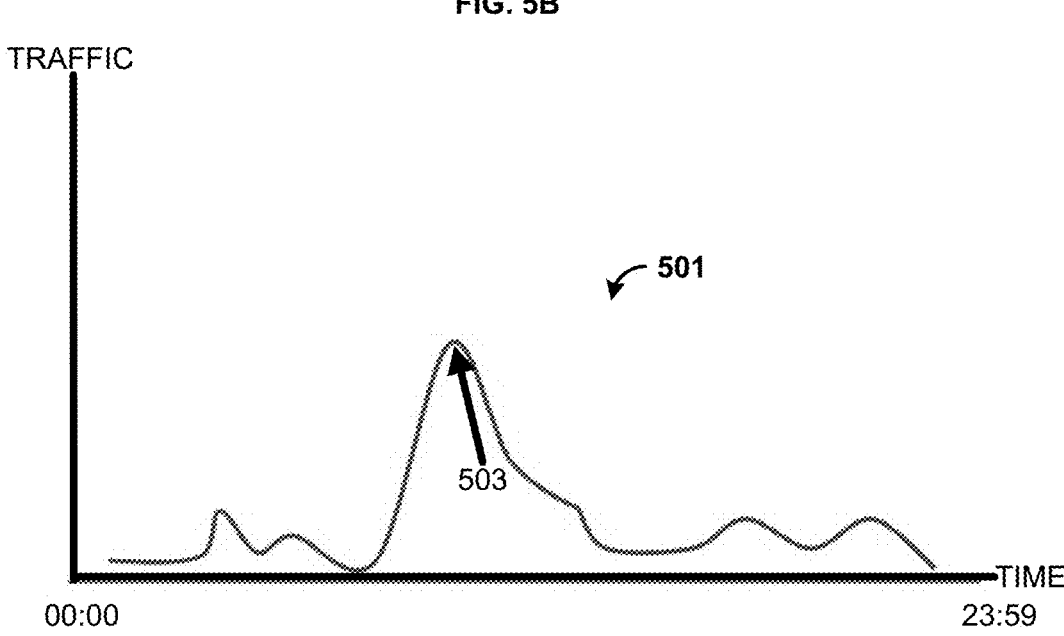

Another example distribution 501 of values of a second performance metric for the client device of the wireless network 400 for the day is shown in FIG. 5B. As FIG. 5B indicates, the second performance metric may be a level of traffic (e.g., a number of packets of data) processed by the client device throughout the day. The level of traffic processed by the client device may vary with respect to time throughout the day. The varying level of traffic may correspond to periods of use and non-use of the client device. The distribution 501 of the values of the second performance metric for the client device may include a period of time 503 identified by the analytics engine 116 via the data acquisition module 202 as being associated with highest levels of traffic processed by the client device during a portion of the day.

Figure 6:
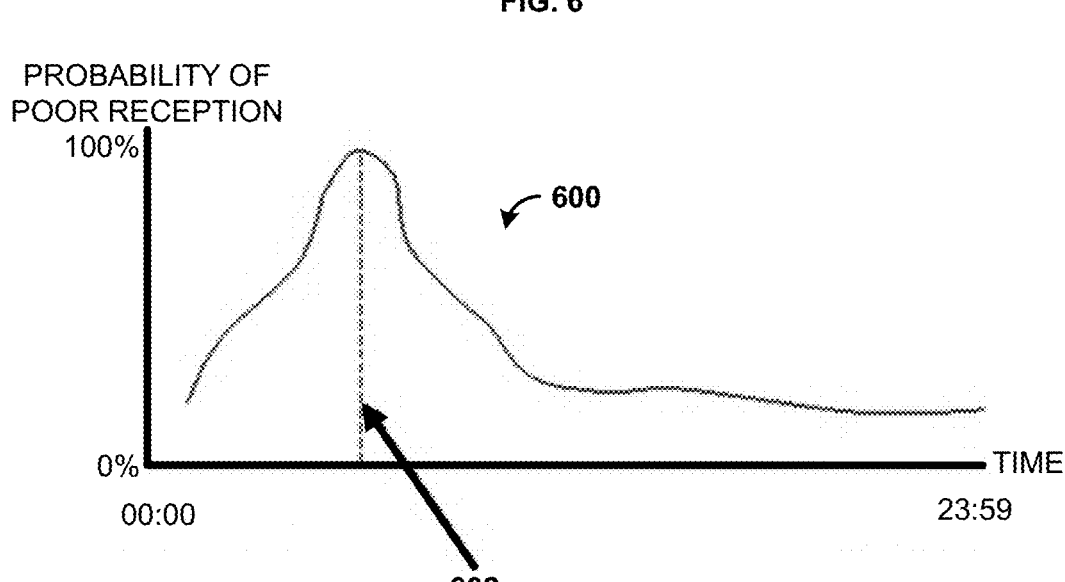
FIG. 6 shows an example line graph.

A further example distribution 600 of values of a third performance metric for the client device of the wireless network 400 for the day is shown in FIG. 6. As FIG. 6 indicates, the third performance metric may be a probability of poor reception that the client device will experience throughout the day. The probability of poor reception may vary with respect to time throughout the day. The varying probability of poor reception may correspond to movement of the client device with respect to the gateway device 402; source(s) of interference; an access point of the wireless network 400; a combination thereof, and/or the like. The distribution 600 of the values of the third performance metric for the client device may include a period of time 602 identified by the analytics engine 116 via the data acquisition module 202 as being associated with a highest probability of poor reception during a portion of the day. As discussed further herein, the analytics engine 116 may consider the period of time 502, the period of time 503, and/or the period of time 602 when assisting the network operator and/or the user of the client device (e.g., via a recommendation presented at the client device) with placement of a network device, such as a wireless network extender, repeater, access point, etc., at a position that extends the coverage area of the gateway device 402.

The network performance data collected/aggregated by the data acquisition module 202 may require cleaning/preparation in order to make the network performance data more useful for the analytics engine 116. The analytics engine 116 may include a data preparation module 204 that may be configured for initial cleaning of the network performance data and for generating intermediate data staging and temporary tables in a database of the data preparation module 204. For example, the data preparation module 204 may divide the network performance data into multiple subsets based on a respective identifier (e.g., a Service Set Identifier ("SSID")) for each of the plurality of wireless networks. The data preparation module 204 may store each subset in a different table in the database.

The data preparation module 204 may standardize the network performance data. For example, one or more of the subsets of the network performance data may include telemetry data in a first format or structure while one or more other subsets of the network performance data may include telemetry data in another format or structure. The data preparation module 204 may standardize the network performance data by converting all telemetry data of all subsets of the network performance data into a common format/structure.

The data preparation module 204 may determine one or more feature calculations based on the network performance data. For example, the data preparation module 204 may determine a feature calculation based on a performance metric for a client device of a wireless network during a given time interval. The performance metric may include a level of signal strength, such as an RSSI for the client device during the given time interval. The performance metric may include an amount of traffic sent/received by the client device during the given time interval. The performance metric may include a network band, such as 2.4 GHz or 5 GHz, used by the client device during the given time interval. The performance metric may include a combination of any of the aforementioned examples, such as a level of signal strength for a given network band; an average level of signal strength for a given network band; and the like. The performance metric may include one or more derived values associated with the client device during the given time interval. For example, a derived value may be an average level of signal strength for the client device during a plurality of time intervals. As another example, a derived value may be an indication of how a level of signal strength for the client device for a given time interval deviates from an average level of signal strength for the client device during a plurality of time intervals (e.g., a standard deviation). A further example of a derived value may be a measure of a symmetry of a distribution of signal strengths for the client device during each of the plurality of time intervals with respect to the average level of signal strength for the client device during the plurality of time intervals (e.g., a skewness). The data preparation module 204 may classify individual pieces of the network performance data. For example, the data preparation module 204 may classify a given performance metric, such as a level of signal strength for a client device, as very-low, low, normal, and/or high, etc.

The analytics engine 116 may include a feature engineering module 206 that may be configured to prepare network performance data for input into a machine learning module 208 of the analytics engine 116. For example, the feature engineering module 206 may generate a data point for each client device of each of the plurality of wireless networks using all corresponding network performance data. A given data point for a given client device may be referred to as a "vector" of network performance data that represents all relevant performance metrics for the given client device. Relevant performance metrics may include, for example, a level of signal strength, an amount of traffic sent/received by the client device; a network band used by the client device during the given time interval; a combination of any of the aforementioned examples; one or more derived values associated with the client device; a combination thereof and/or the like.

As another example, the feature engineering module 206 may clean the network performance data by removing duplicate records in the database for a given client device and/or wireless network when multiple entries for the given client device and/or wireless network are present in the network performance data. The feature engineering module 206 may also eliminate any feature calculations (e.g., based on a performance metric(s)) that are present within the network performance data less than a threshold amount of times. For example, a feature calculation having 10 or fewer occurrences within the network performance data may not contribute significantly towards assisting with a recommendation for a placement of a network device to improve overall network performance for a client device.

The feature engineering module 206 may be further configured to perform feature engineering. Two machine learning models may be implemented by the analytics engine 116 to manage a wireless network and optimize network service for associated client devices. A first machine learning model may be a binary classifier that indicates whether a given wireless network would likely benefit from adding a network device, such as a wireless range extender, to improve overall network performance for associated client devices. A second machine learning model may be an unsupervised model (e.g., no dependent variables/labels are used). The second machine learning model may be used to determine whether a client device of a given wireless network will experience poor network performance. The second machine learning model may provide a prediction of whether the client device will experience poor network performance at various times throughout a day. The prediction may range between 0 and 1. A value of '1' may indicate the client device will likely experience poor overall network performance during the given time interval, while a value of '0' may indicate otherwise (e.g., the given client device will not likely experience poor overall network performance during the given time interval). A value of each dependent variable may be predicted using machine learning algorithms discussed herein and independent variables/features that are engineered by the feature engineering module 206.

The feature engineering module 206 may generate new independent variables/features or modify existing features that can improve a determination of a target variable (e.g., whether a given wireless network would likely benefit from adding a network device, such as a wireless range extender). The feature engineering module 206 may eliminate feature calculations that do not have significant effect on the target variable. That is, the feature engineering module 206 may eliminate feature calculations that do not have significant effect when determining whether a given wireless network would likely benefit from adding a network device, such as a wireless range extender. For example, the network performance data may be analyzed according to additional feature selection techniques to determine one or more independent variables/features that have a significant effect when determining whether a given wireless network would likely benefit from adding a network device. Any suitable computational technique may be used to identify the one or more independent variables/features using any feature selection technique such as filter, wrapper, and/or embedded methods. For example, the one or more independent variables/features may be selected according to a filter method, such as Pearson's correlation, linear discriminant analysis, analysis of variance (ANOVA), chi-square, combinations thereof, and the like. As another example, the one or more independent variables/features may be selected according to a wrapper method configured to use a subset of features and train a machine learning model using the subset of features. Based on inferences that may be drawn from a previous model, features may be added and/or deleted from the subset. Wrapper methods include, for example, forward feature selection, backward feature elimination, recursive feature elimination, combinations thereof, and the like. As a further example, the one or more independent variables/features may be selected according to an embedded method that may combine the qualities of the filter and wrapper methods. Embedded methods include, for example, Least Absolute Shrinkage and Selection Operator (LASSO) and ridge regression which implement penalization functions to reduce overfitting.

Figure 9:
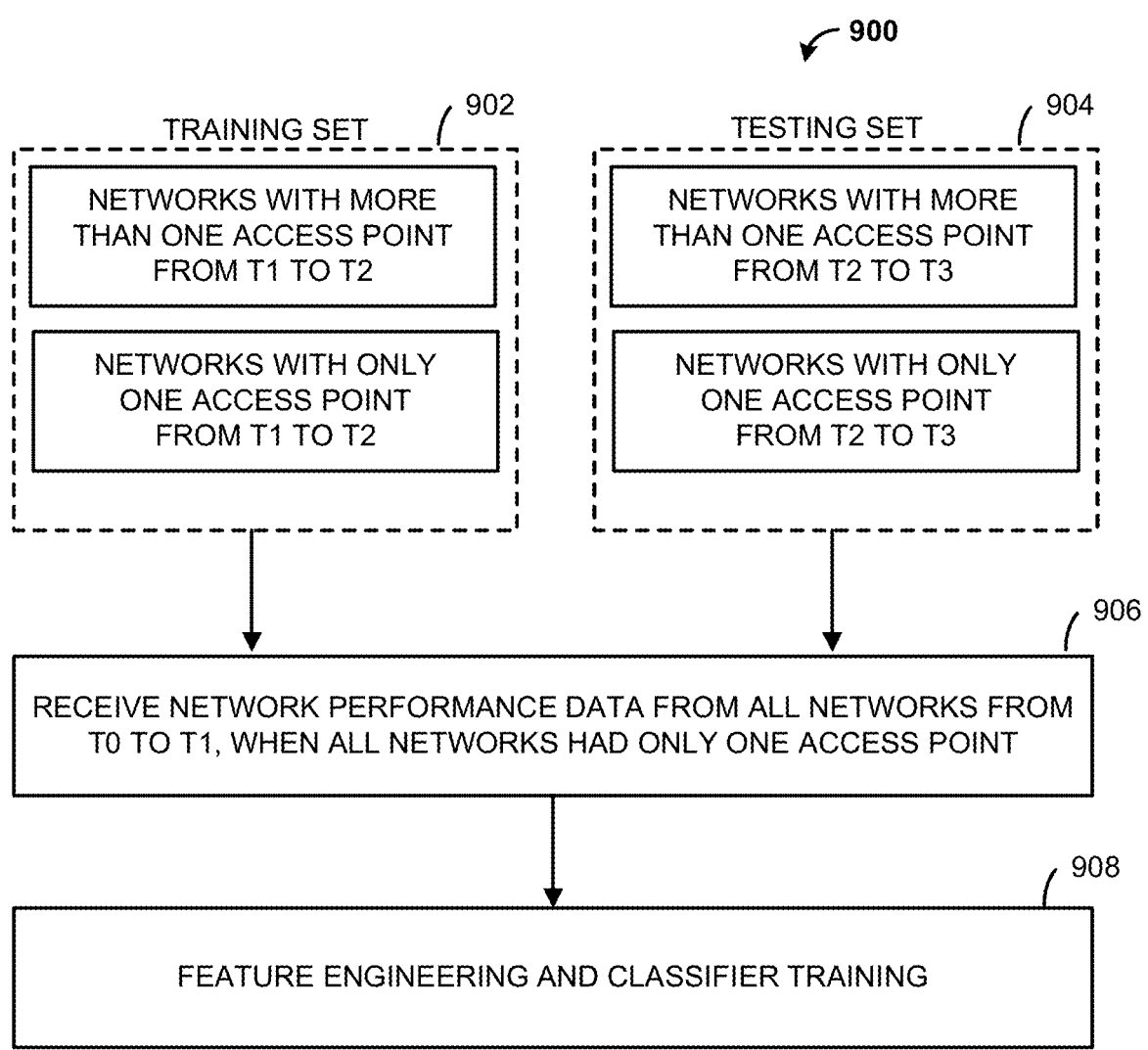
FIG. 9 shows an example process flowchart.

The feature engineering module 206 may also group and categorize each of the plurality of client devices. For example, mobile client devices, such as laptops, mobile phones, etc., may be associated with performance metrics that vary greatly throughout a plurality of time intervals (e.g., based on movement of the mobile client devices with respect to a gateway or access point). In contrast, stationary client devices, such as desktops, smart speakers, etc., may be associated with performance metrics that do not vary greatly throughout a plurality of time intervals. Accordingly, the feature engineering module 206 may categorize client devices as being mobile or stationary. Further discussion of the feature engineering module 206 follows herein with respect to the classifier training process shown in FIG. 9.

The analytics engine 116 may include a machine learning module 208 and a recommendation module 210. The machine learning module 208 may implement the first machine learning model, and the recommendation module 210 may implement the second machine learning model. The machine learning module 208 may be configured to utilize various machine learning techniques, such as the first machine learning model described herein, to analyze network performance data for a wireless network and to determine whether the wireless network would likely benefit from adding a network device, such as a wireless range extender. The machine learning module 208 may indicate to the recommendation module 210 whether placement of one or more network devices, such as an extender, repeater, access point, etc., within a coverage area of a gateway device of the wireless network would improve overall network performance for one or more client devices of the wireless network.

The machine learning module 208 may take empirical data as an input and recognize patterns within the data. As an example, the empirical data may be network performance data for a wireless network. The network performance data may include a plurality of performance metrics/features determined by the feature engineering module 206. For example, the metrics/features may be aggregated measures from all client devices of a wireless network. As shown in FIG. 8, an example table of a plurality of performance metrics/features 800 may include a first column 802 indicating a name for each metric/feature and a corresponding coefficient for each metric/feature as shown in a second column 804. The coefficient for a metric/feature may indicate a relative weight of importance of the metric/feature with respect to its impact on network performance. As discussed further herein, the machine learning module 208 may determine a subset of the plurality of performance metrics/features 800 that have the most impact on the network performance for the associated client device of the wireless network. For example, the subset of the plurality of performance metrics/features 800 may include the metrics/features shown in FIG. 8 in bold.

The machine learning module 208 may use a trained classifier and the first machine learning model when determining whether placement of one or more network devices (hereinafter "one or more extenders") within a coverage area of a gateway device of a wireless network would improve overall network performance for one or more client devices of the wireless network. In making this determination, the machine learning module 208 may determine whether an aggregate of one or more performance metrics (e.g., as indicated by the network performance data) meet or exceed a prediction threshold. For example, if the aggregate of the one or more performance metrics results in a prediction of 70% that a given wireless network would benefit from adding a network device, such as a wireless range extender, then the prediction threshold may be met (e.g., a prediction above 70% may therefore exceed the threshold). Other values for the prediction threshold may be used.

Each of the one or more performance metrics may be associated with a desired level of performance, such as a performance threshold. As an example, a performance metric may relate to an expected mean value of RSSI for a client device throughout a day. The aggregate of the one or more performance metrics may not meet or exceed a performance threshold when the mean RSSI for the client device is determined to fall below the expected mean value. As another example, a performance metric may relate to an amount by which a level of RSSI for the client device for a time interval during the day (e.g., an hour) deviates from the mean RSSI for the client device throughout the day. When the level of RSSI for the client device during the time interval deviates at least a specified number of standard deviations (e.g., 3) from the mean RSSI, the level of RSSI for that time interval may be considered an outlier and thus falling below (e.g., not meeting or exceeding) the performance threshold. As a further example, a performance metric may relate to a level of skewness of a distribution of values of the level of RSSI for the client device during each of a plurality of time intervals of the day. The level of skewness may be a measure of a symmetry of the distribution of the values of the level of RSSI for the client device during each of the plurality of time intervals of the day with respect to the mean RSSI for the client device during the day. When the level of skewness is determined to be at least a specified level of skewness (e.g., less than-0.4 or greater than 0.4), the level of RSSI for that time interval may be considered to fall below (e.g., not meeting or exceeding) the performance threshold.

The machine learning model may include parameters, such as the plurality of performance metrics/features 800 shown in FIG. 8, that are optimized by the machine learning module 208 for minimizing a cost function associated with the machine learning model given the input network performance data. For instance, in the context of classification (e.g., determining that a wireless network would or would not benefit from one or more extenders), the machine learning model may be visualized as a straight line that separates the network performance data into two classes (e.g., labels). The cost function may consider a number of misclassified points of network performance data. The misclassified points may be a plurality of data points (e.g., one or more performance metrics) that the machine learning model incorrectly classifies as not meeting or exceeding the performance threshold. A learning process of the machine learning model may be employed by the machine learning module 208 to adjust coefficient values for the parameters (e.g., as shown in the second column 804 of FIG. 8) such that the number of misclassified points is minimal. After this optimization phase (e.g., learning phase), the machine learning model may be used to classify new data points for a test of network performance data.

The machine learning module 208 may employ one or more supervised, unsupervised, or semi-supervised machine learning models. Generally, supervised learning entails the use of a training set of data as discussed herein that may be used to train the machine learning model to apply labels to the input data. For example, the training data may include network performance data containing a plurality of data points (e.g., performance metrics) that may, or may not, meet the performance threshold and may be labeled as such. Unsupervised techniques, on the other hand, do not require a training set of labels. While a supervised machine learning model may determine whether previously seen patterns in a training dataset have been correctly labeled in a testing dataset, an unsupervised model may instead determine whether there are sudden changes in values of the plurality of data points. Semi-supervised machine learning models take a middle ground approach that uses a greatly reduced set of labeled training data as known in the art.

The machine learning module 208 may employ one or more machine learning algorithms such as, but not limited to, a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic or other regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The machine learning module 208 may include any number of machine learning models to perform the techniques herein, such as for cognitive analytics, predictive analysis, and/or trending analytics as known in the art.

Figure 7:
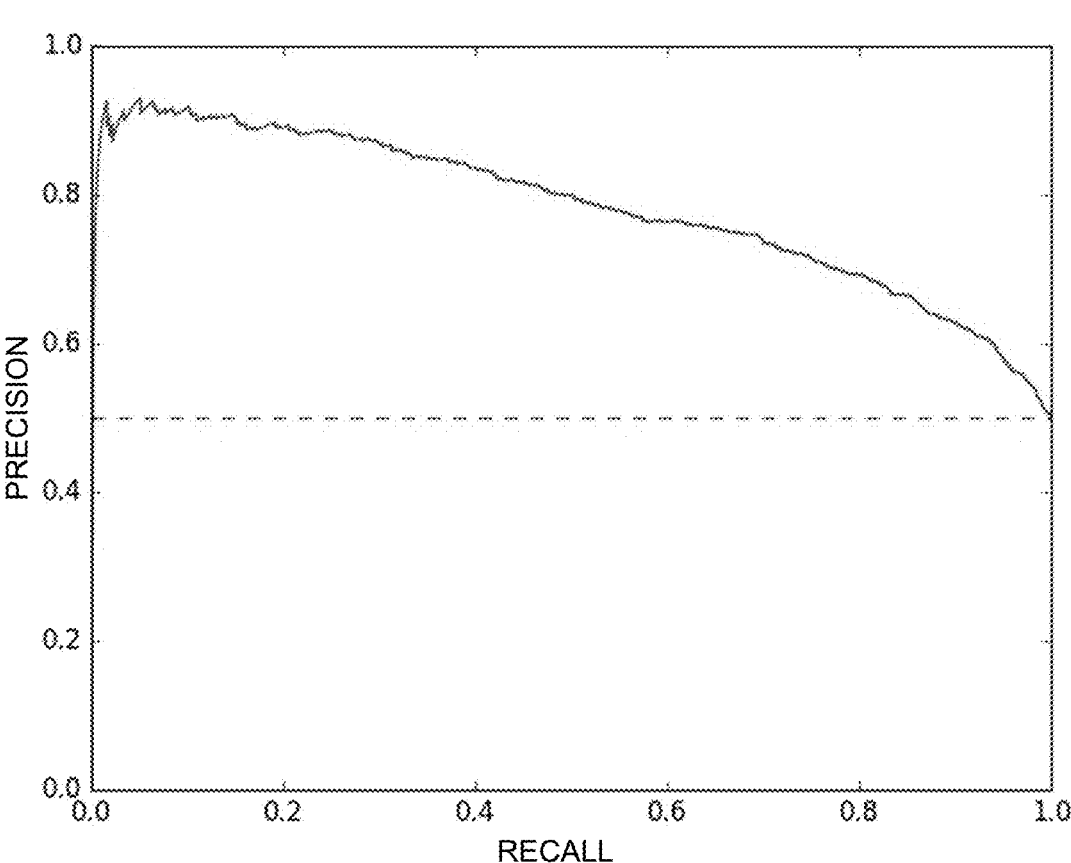
FIG. 7 shows an example line graph.

Performance of the machine learning module 208 may be evaluated in a number of ways based on a number of true positives, false positives, true negatives, and/or false negatives classifications of the plurality of data points indicated by the machine learning model. For example, the false positives of the machine learning model may refer to a number of times the model incorrectly classified one or more performance metrics as not meeting or exceeding the performance threshold (e.g., incorrectly indicating the performance metrics are not indicative of poor overall network performance that could be improved by adding one or more extenders to the associated wireless network). Conversely, the false negatives of the machine learning model may refer to a number of times the machine learning model classified one or more performance metrics as meeting or exceeding the performance threshold when, in fact, the one or more performance metrics did not meet or exceed the performance threshold. True negatives and true positives may refer to a number of times the machine learning model correctly classified the one or more performance metrics with respect to meeting, or not meeting, the performance threshold, respectively. Related to these measurements are the concepts of recall and precision. An example graph of precision and recall results of the machine learning model is shown in FIG. 7. Generally, recall refers to a ratio of true positives to a sum of true positives and false negatives, which quantifies a sensitivity of the machine learning model. Similarly, precision refers to a ratio of true positives a sum of true and false positives.

As discussed herein, the analytics engine 116 may include a recommendation module 210. The machine learning module 208 may indicate to the recommendation module 210 whether placement of one or more extenders within a coverage area of a gateway device of a wireless network would improve overall network performance for one or more client devices of the wireless network. When the machine learning module 208 indicates to the recommendation module 210 that placement of one or more extenders within the coverage area would be beneficial for the one or more client devices, the recommendation module 210 may assist the network operator and/or the users of the one or more client devices with placement of the one or more extenders via a recommendation. In doing so, the recommendation module 210 may implement one or more unsupervised machine learning techniques that may not require a training set of labels. That is, while a supervised machine learning model may determine whether previously seen patterns in a training dataset have been correctly labeled in a testing dataset, an unsupervised model may instead determine whether there are sudden changes in values of the plurality of data points (e.g., wireless reception). The recommendation may be displayed at an interface of at least one of the one or more client devices. The recommendation may indicate an identifier for each of the one or more client devices. The recommendation may also include an indication of a probability of poor reception experienced by the one or more client devices during one or more intervals of time throughout the day.

Figure 10:
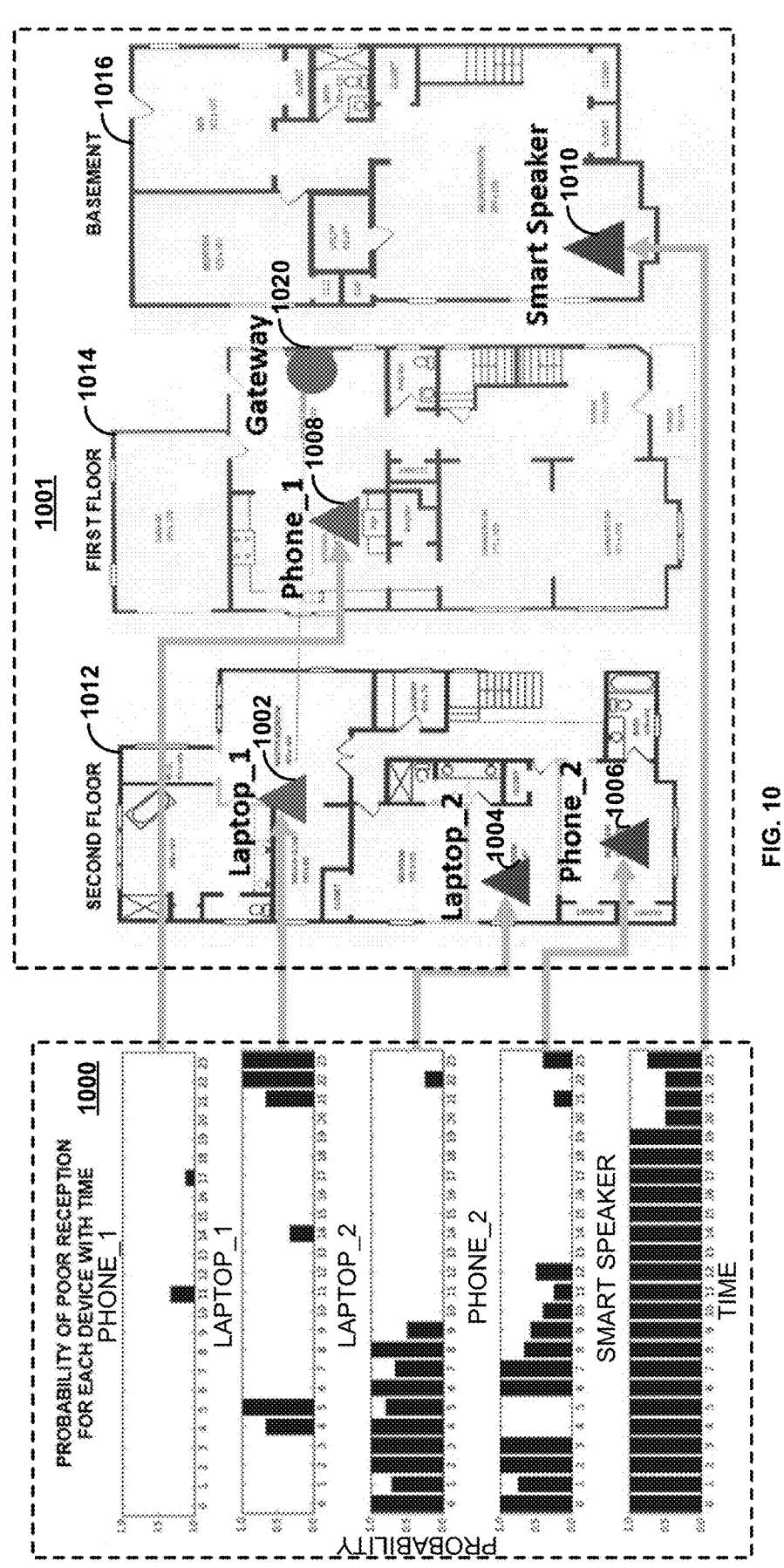
FIG. 10 shows example bar graphs and an example system environment.

FIG. 10 shows an example recommendation 1000 the recommendation module 210 may provide for a wireless network including five client devices: Phone_1 1008; Laptop_1 1002; Laptop_2 1004; Phone_2 1006; and Smart Speaker 1010. FIG. 10 further shows an example network topology 1001 to indicate a location of each of the five client devices 1002, 1004, 1006, 1008, 1010 with respect to a gateway 1020 during at least one interval of time throughout the day associated with a level of reception for each client device that falls below a desired level of performance, such as a performance threshold. The recommendation 1000 may include a graph for each client device as shown in FIG. 10, and each graph may indicate a level of probability that the client device will experience poor reception during each hour of a day. As indicated by the recommendation 1000, Laptop_2 1004 is likely to experience poor reception between hour 0 (e.g., 12:00 AM) and hour 9 (e.g., 10:00 AM). As indicated by the network topology 1001, Laptop_2 1004 is located at a position on a second floor 1012 between hours 0 and 9, while the gateway 1020 is located on a first floor 1014. The recommendation 1000 may further include a message indicating a period of time (e.g., between hours 0 and 9) during which Laptop_2 1004 is likely to experience poor reception and a suggestion that a user or network operator place an extender at a position between the gateway 1020 and Laptop_2's 1004 expected/historical locations during the period of time. As an example, the message may be the following: "It is recommended that an extender(s) be placed within the general area(s) that is between Laptop_2 and the gateway between Midnight and 10:00 AM." As discussed herein, the analytics engine 116 may not have knowledge of the network topology 1001. Accordingly, the message may not indicate specified locations, such as the second floor 1012 or the first floor 1014.

As discussed herein, the feature engineering module 206 may categorize client devices as being mobile or stationary. A stationary client device, such as the Smart Speaker 1010 may experience a relatively consistent level of reception throughout the day. For example, as indicated by the recommendation 1000, the Smart Speaker 1010 may be associated with a high probability of experiencing poor wireless signal throughout the day. As indicated by the network topology 1001, the Smart Speaker 1010 is located at a position in a basement 1016 below the gateway 1020. Thus, the recommendation 1000 may include a suggestion that an extender be added between the gateway's 1020 location and the Smart Speaker's 1010 location, since the Smart Speaker experiences consistent poor reception with regularity.

Figure 11:
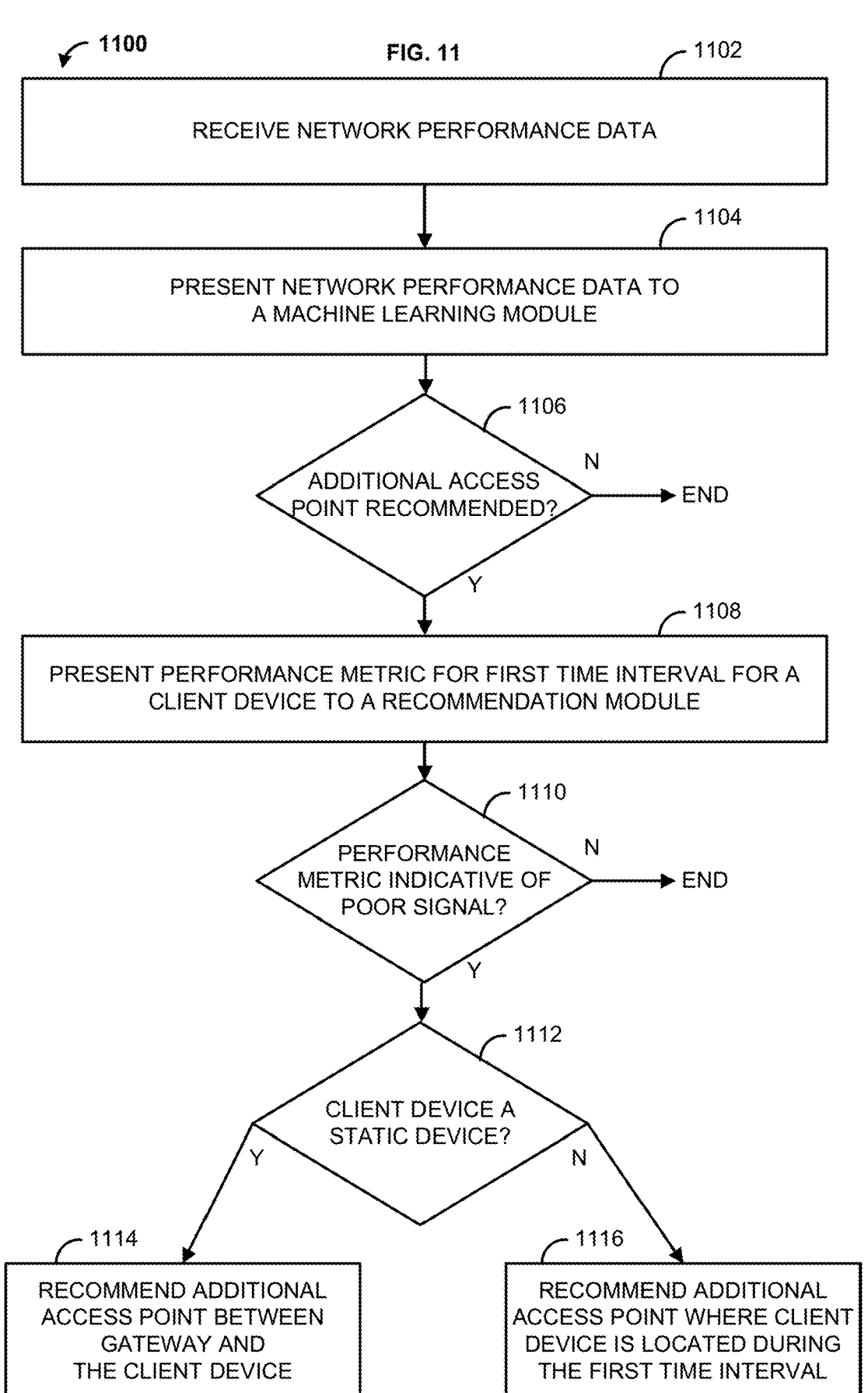
FIG. 11 shows an example process flowchart.

Turning now to FIG. 11, an example workflow 1100 is shown. The workflow 1100 may be implemented by the analytics engine 116 when assisting a network operator and/or a user of a client device (e.g., via a recommendation presented at the client device) with placement of one or more extenders. At step 1102, the data acquisition module 202 may receive network performance data for a wireless network, such as the wireless network 400 as shown in FIG. 4.

At step 1104, the machine learning module 208 may utilize the various machine learning techniques discussed herein to analyze the network performance data to determine whether a given wireless network would likely benefit from adding a network device, such as a wireless range extender, to the wireless network. The machine learning module 208 may use a trained classifier to determine whether a plurality of performance metrics indicated by the network performance data meet or exceed a desired level of performance, such as a performance threshold. For example, the machine learning module 208 may determine whether an aggregate of the plurality of performance metrics (e.g., as indicated by the network performance data) meet or exceed a prediction threshold.

At step 1106, the machine learning module 208 may determine whether it is recommended that one or more extenders be added to the wireless network. If the aggregate of the plurality of performance metrics meets or exceeds the performance threshold, then the machine learning module 208 may determine it is recommended that one or more extenders be added and the workflow 1100 continues at step 1108. For example, if the aggregate of the one or more performance metrics results in a prediction of 70% that the wireless network would benefit from adding a network device, such as a wireless range extender, then the prediction threshold may be met (e.g., a prediction above 70% may therefore exceed the threshold). However, if the aggregate of the plurality of performance metrics does not meet or exceed the performance threshold, then the workflow 1100 ends after step 1106.

At step 1108, the recommendation module 210 may use the second machine learning model as described herein to determine whether one or more performance metrics (e.g., as indicated by the network performance data) for each client device meet or exceed the performance threshold during a plurality of time intervals (e.g., throughout a day). The recommendation module 210 may implement one or more unsupervised machine learning techniques that may not require a training set of labels. That is, the recommendation module 210 may determine whether there are sudden changes in values of the one or more performance metrics (e.g., wireless reception). If a performance metric associated with a client device meets or exceeds the performance threshold, then the machine learning module 208 may determine that the performance metric is not indicative of poor signal at step 1110 (e.g., the level of wireless reception for the given time interval is not an outlier value), and the workflow 1100 ends for that client device. However, if a performance metric the client device does not meet or exceed the performance threshold, then the recommendation module 210 may determine that the performance metric is indicative of poor signal for that client device at step 1110 (e.g., at the given time interval). At step 1112, the analytics engine 116 may determine whether the client device is a mobile device or a stationary (e.g., static) device. If the client device is a stationary device, at step 1114 the recommendation module 210 may provide a recommendation indicating that an extender(s) (e.g., an access point) should be placed at a position between a gateway of the wireless network and the client device. If the client device is a mobile device, at step 1116 the recommendation module 210 may provide a recommendation indicating that an extender(s) (e.g., an access point) should be placed at a position within the gateway's coverage area and proximate to the client device's expected/historical location during a period of time associated with the performance metric that did not meet or exceed the performance threshold.

As discussed herein, the machine learning module 208 may be configured to train a classifier of a machine learning model(s) that may be used to classify whether a performance metric is indicative of poor overall network performance for a client device of a wireless network. The machine learning module 208 may receive a training dataset that includes network performance data for a plurality wireless networks as an input that may be used to train the classifier. When training the classifier, the machine learning module 208 may evaluate several machine learning algorithms using various statistical techniques such as, for example, accuracy, precision, recall, F1-score, confusion matrix, receiver operating characteristic ("ROC") curve, and/or the like. The machine learning module 208 may also use a Random Forest algorithm, a Gradient Boosting algorithm, an Adaptive Boosting algorithm, K-Nearest Neighbors algorithm, a Naïve Bayes algorithm, a Logistic Regressor Classifier, a Support Vector machine, a combination thereof and/or the like when training the classifier. Gradient Boosting may add predictors to an ensemble classifier (e.g., a combination of two or more machine learning models/classifiers) in sequence to correct each preceding prediction (e.g., by determining residual errors). The K-Nearest Neighbors algorithm may receive each data point within the network performance data and compare each to the "k" closest data points. The AdaBoost Classifier may attempt to correct a preceding classifier's predictions by adjusting associated weights at each iteration. The Support Vector Machine may plot data points within the network performance data in n-dimensional space and identify a best hyperplane that separates the performance metrics indicated by the network performance data into two groups (e.g., meeting the performance threshold vs. not meeting the performance threshold). Logistic Regression may be used to identify an equation that may estimate a probability of a client device experiencing poor reception as a function of a feature vector of performance metrics. Gaussian Naïve Bayes may be used to determine a boundary between the two groups of performance metrics based on Bayesian conditional probability theorem. A Random Forest Classifier may comprise a collection of decision trees that are generated randomly using random data sampling and random branch splitting (e.g., in every tree in the random forest), and a voting mechanism and/or averaging of outputs from each of the trees may be used to determine whether a performance metric meets or does not meet the performance threshold.

The machine learning module 208 may select one or more machine learning models to generate an ensemble classifier (e.g., an ensemble of one or more classifiers). Selection of the one or more machine learning models may be based on each respective models' F-1 score, precision, recall, accuracy, and/or confusion metrics (e.g., minimal false positives/negatives). For example, the ensemble classifier may use Random Forest, Gradient Boosting Machine, Adaptive Boosting, Logistic Regression, and Naïve Bayes models. The machine learning module 208 may use a logistic regression algorithm as a meta-classifier. The meta-classifier may use respective predictions of each model of the ensemble classifier as its features to make a separate determination of whether a performance metric meets or does not meet the performance threshold for a client device. The machine learning module 208 may train the ensemble classifier based on the training dataset. For example, the machine learning module 208 may train the ensemble classifier to predict results for each of the multiple combinations of performance metrics/variables within the training dataset. The predicted results may include soft predictions, such as one or more predicted results, and a corresponding likelihood of each being correct. For example, a soft prediction may include a value between 0 and 1 that indicates a likelihood of a client device experiencing poor reception during an interval of time, with a value of 1 being a prediction with 100% accuracy that the client device will experience poor reception, and a value of 0.5 corresponding to a 50% likelihood that the client device will experience poor reception. The machine learning module 208 may make the predictions based on applying the features engineered by the feature engineering module 206 to each of the multiple combinations of performance metrics/variables within the training dataset.

The meta-classifier may be trained using the predicted results from the ensemble classifier along with the corresponding combinations of performance metrics/variables within the training dataset. For example, the meta-classifier may be provided with each set of the performance metrics/variables and the corresponding prediction from the ensemble classifier. The meta-classifier may be trained using the prediction from each classifier that is part of the ensemble classifier along with the corresponding combinations of variables.

The meta-classifier may be trained to output improved predictions that are based on the resulting predictions of each classifier of the ensemble classifier based on the same variables. The meta-classifier may then receive a testing dataset that includes network performance data and performance metrics/variables for a testing set of wireless networks, and the meta-classifier may predict whether a client device of a wireless network within the testing dataset will experience poor reception based on the performance metrics/variables indicated by the network performance data of the testing dataset. The prediction by the meta-classifier that is based on the ensemble classifier may include one or more predicted results along with a likelihood of accuracy of each prediction.

Returning to FIG. 9, an example training process 900 for a machine learning classifier is shown. The analytics engine 116 may implement the training process 900 when training the classifier. A training dataset 902 may include network performance data between time one (T1) and time two (T2) for a first plurality of wireless networks and a second plurality of wireless networks. The first plurality of wireless networks may include two or more gateways/access points between T1 and T2, and the second plurality of wireless networks may include only one gateway/access point between T1 and T2. A testing dataset 904 may include network performance data between T2 and time three (T3) for the first plurality of wireless networks and the second plurality of wireless networks. The first plurality of wireless networks may include two or more gateways/access points between T2 and T3, and the second plurality of wireless networks may include only one gateway/access point between T2 and T3.

At step 906, the analytics engine 116 may receive network performance data for each of the first and second plurality of wireless networks between time zero (TO) and T1. Between T0 and T1, each of the first and second plurality of wireless networks may have included only one gateway/access point. At step 908, the classifier is trained by the machine learning module 208 using one or more of the machine learning models and/or techniques discussed herein (e.g., a binary classifier) applied to the network performance data received at step 906 and the training dataset 902. The machine learning module 208 may determine one or more performance metrics within the network performance data received at step 906 that have the most impact on network performance for the client devices. The one or more performance metrics may then be used to train the classifier to determine whether placement of one or more extenders for the second plurality of wireless networks would be beneficial. For example, the machine learning module 208 may determine that the one or more performance metrics for the first plurality of networks improved (e.g., indicative of improved wireless reception) between T1 and T2 as compared to between T0 and T1. The one or more performance metrics for the second plurality of networks between T0 and T1 may be comparable to the one or more performance metrics for the first plurality of networks between T0 and T1. Thus, the machine learning module 208 may determine that second plurality of wireless networks may benefit from adding a wireless range extender.

Figure 12:
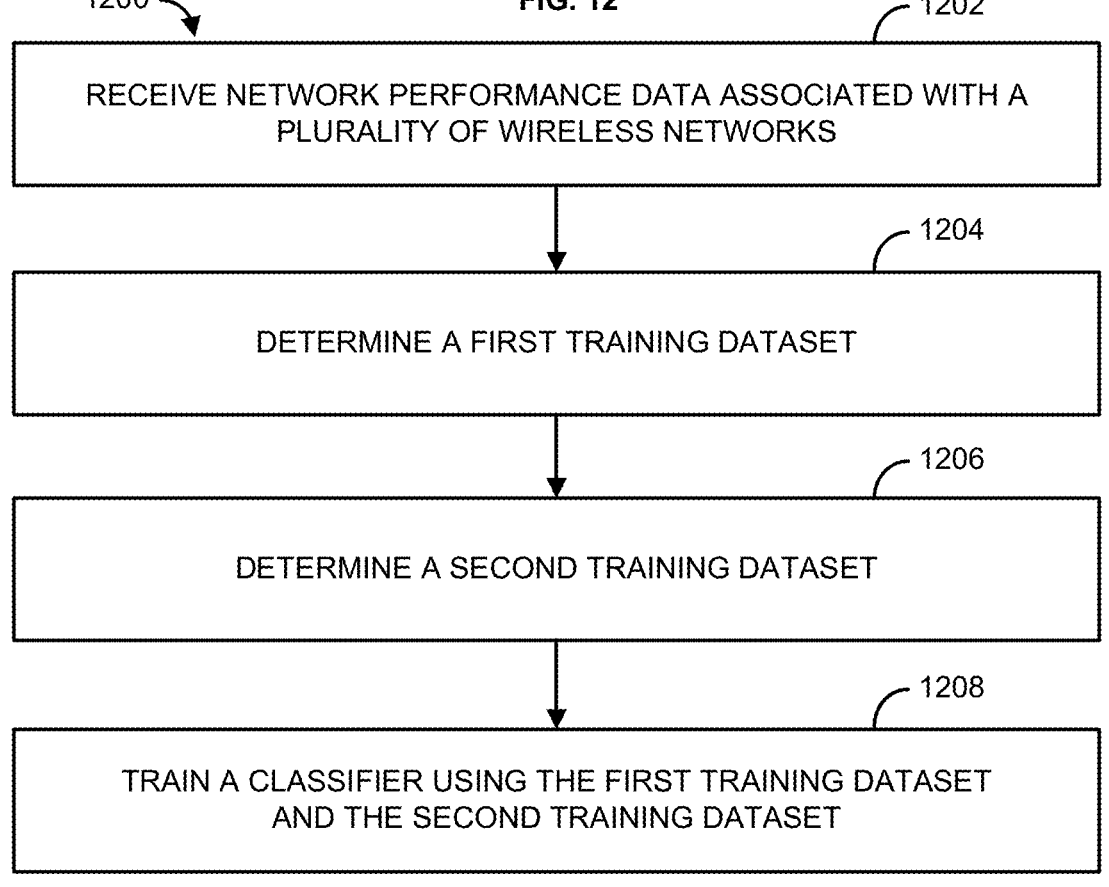
FIG. 12 shows an example method.

Turning now to FIG. 12, an example method 1200 for managing a wireless network is shown. The method 1100 may be performed by the analytics engine 116 of FIG. 1. The computing device 107A, 107B, or 107C of FIG. 1 may be used to interact with the analytics engine 116 when implementing the method 1200. One or more steps of the method 1200 may incorporate one or more steps of the training process 900 to train a machine learning classifier.

At step 1202, a computing device may receive network performance data for each of a plurality of wireless networks for a first time period and a second time period. The computing device may be the server 102 or the computing device 107A, 107B, or 107C. Each of the plurality of wireless networks may include at least one client device, such as the gateway 106 or any other user device as described herein that is capable of connecting to a wireless network. The network performance data may indicate a number of client devices in communication with each wireless network and one or more performance metrics for one or more of the client devices, such as a received signal strength ("RSSI"), a data reception rate, a data transmission rate, an amount of network traffic processed, a combination thereof, and/or the like. The network performance data may associate each of the one or more performance metrics with a timestamp (e.g., date/time) and/or an interval of time (e.g., a minute, an hour, a day, etc.).

At step 1204, the computing device may determine a first training dataset for training the machine learning classifier. The first training dataset may be based on the network performance data. The first training dataset may include the network performance data for a first plurality of wireless networks, which may be a subset of the plurality of wireless networks. Each of the first plurality of wireless networks may have only one access point device, such as a gateway device and a network device configured to extend a coverage area of the gateway device (e.g., a wireless extender), between a first time and a second time. Each of the first plurality of wireless networks may have at least one static client device, such as a smart speaker or network-enabled device, and at least one mobile client device, such as a user device (e.g., laptop, tablet, mobile phone, etc.).

At step 1206, the computing device may determine a second training dataset for training the machine learning classifier. The second training dataset may be based on the network performance data. The second training dataset may include the network performance data for a second plurality of wireless networks, which may be another subset of the plurality of wireless networks. Each of the second plurality of wireless networks may have one access point device, such as a gateway device, for the first time and the second time. Each of the second plurality of wireless networks may have at least one static client device, such as a smart speaker or network-enabled device, and at least one mobile client device, such as a user device (e.g., laptop, tablet, mobile phone, etc.).

At step 1208, the computing device (e.g., the analytics engine 116) may use the first training dataset and the second training dataset to train the machine learning classifier. When training the classifier, the computing device may determine a level of RSSI for each of a plurality of time intervals for at least one client device of a first network of the first training dataset. The computing device may determine a level of RSSI for each of the plurality of time intervals for at least one client device of a second network of the second training dataset. The computing device may determine a desired level of performance, such as a performance threshold, using the determined levels of RSSI for each of the plurality of time intervals for the at least one client device of the first network and the determined levels of RSSI for each of the plurality of time intervals for the at least one client device of the second network.

The desired level of performance may relate to an expected mean level RSSI for a client device during the plurality of time intervals. The performance metric may not be met or exceeded when the mean RSSI for the client device is determined to fall below the expected mean value. As another example, the desired level of performance may relate to an amount by which a level of RSSI for the client device for a time interval during the day (e.g., an hour) deviates from the mean RSSI for the client device throughout the day. When the level of RSSI for the client device during the time interval deviates at least a specified number of standard deviations (e.g., 3) from the mean RSSI, the level of RSSI for that time interval may be considered an outlier and thus falling below (e.g., not meeting or exceeding) the performance threshold. As a further example, the desired level of performance may relate to a level of skewness of a distribution of values of the level of RSSI for the client device during each of the plurality of time intervals. The level of skewness may be a measure of a symmetry of the distribution of the values of the level of RSSI for the client device during each of the plurality of time intervals with respect to the mean RSSI for the client device during the day. When the level of skewness is determined to be at least a specified level of skewness (e.g., less than −0.4 or greater than 0.4), the level of RSSI for that time interval may be considered to fall below (e.g., not meeting or exceeding) the performance threshold.

The computing device may receive a testing dataset having network performance data for the first plurality of wireless networks a test wireless network (e.g., network performance data not previously encountered by the computing device) between the second time and a third time. The first plurality of wireless networks may have at least two access points between the second time and the third time. The test wireless network may be the second plurality of wireless networks. The test wireless network may have at least one test client device and one access point. The computing device may determine a performance metric for the at least one test client device during each of a plurality of time intervals. Using the trained classifier, the computing device may determine that a first value for the performance metric during at least one time interval of the plurality of time intervals meets or exceeds the performance threshold (e.g., indicating a strong prediction that adding a wireless extender would be beneficial). The computing device may determine based on the first value for the performance metric meeting or exceeding the performance threshold that the test wireless network would benefit from adding a network device, such as a wireless range extender, to the network. The computing device may then determine a recommendation for placement of the network device at a location associated with the at least one test client device and the at least one time interval. The recommendation may indicate an identifier for the at least one test client device. The recommendation may also include an indication of a probability of poor reception experienced by the at least one test client device during one or more intervals of the plurality of time intervals.

The computing device may receive further network performance data associated with the at least one test client device for a second plurality of time intervals (e.g., separate from the plurality of time intervals). During the second plurality of time intervals, the test wireless network may include the at least one test client device, the first access point, and the network device associated with the recommendation (e.g., second access point). The computing device may use the second network performance data to determine that a second value for the performance metric during at least one time interval of the second plurality of time intervals is above the performance threshold. The at least one time interval of the second plurality of time intervals may correspond to at least one time interval of the plurality of time intervals (e.g., a same time of a day, or a same portion thereof). The computing device may determine that the second value for the performance metric falls below the performance threshold (e.g., adding the network device provided a benefit with respect to network performance for the at least one test client device).

Figure 13:
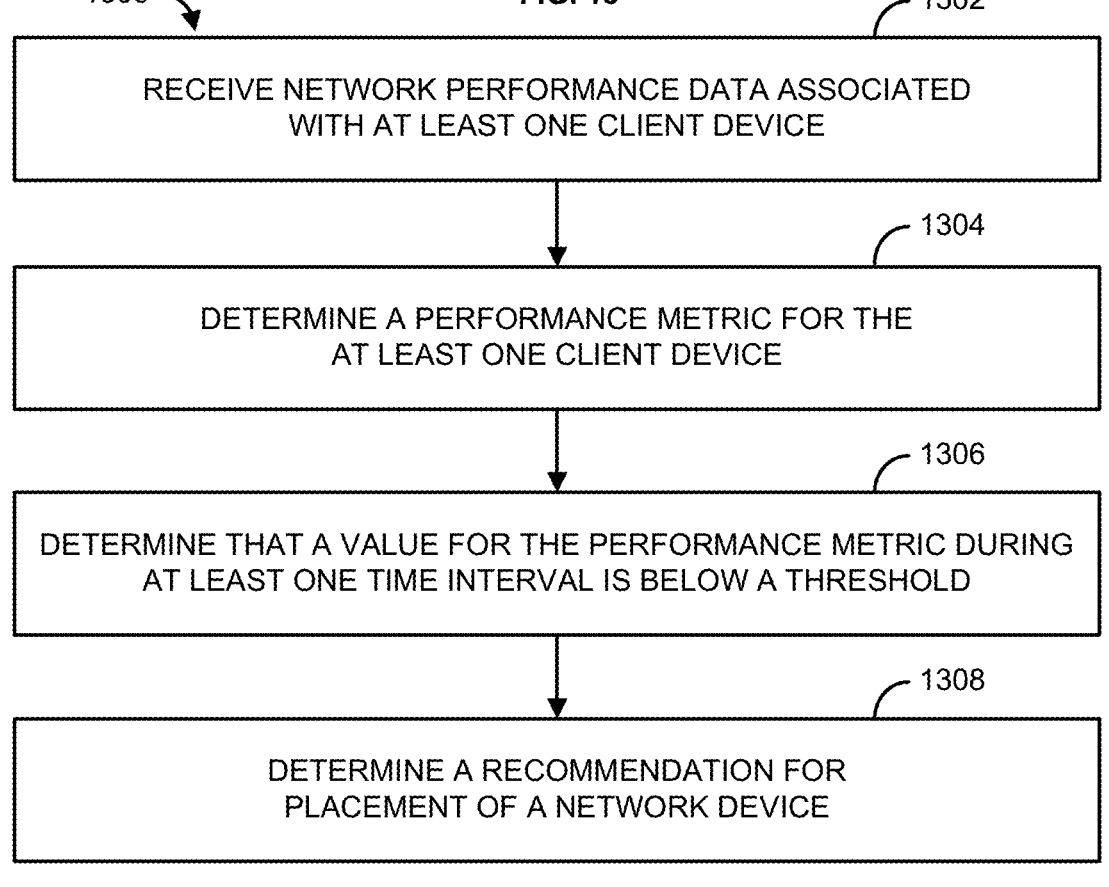
FIG. 13 shows an example method.

Turning now to FIG. 13, an example method 1300 for managing a wireless network is shown. The method 1300 may be performed by the analytics engine 116 of FIG. 1. The computing device 107A, 107B, or 107C of FIG. 1 may be used to interact with the analytics engine 116 when implementing the method 1300. At step 1302, a computing device may receive network performance data associated with at least one client device of a wireless network. The computing device may be the server 102 or the computing device 107A, 107B, or 107C. The at least one client device may be the gateway 106 or any other user device as described herein that is capable of connecting to the wireless network.

At step 1304, the computing device may determine a performance metric for the at least one client device during each of a plurality of time intervals. The performance metric may be a received signal strength ("RSSI"), a data reception rate, a data transmission rate, an amount of network traffic processed, a combination thereof, and/or the like. The computing device may associate the performance metric with a timestamp (e.g., date/time) and/or an interval of time (e.g., a minute, an hour, a day, etc.). At step 1306, using an unsupervised model (e.g., the second machine learning model described herein), the computing device may determine that a first value for the performance metric during at least one time interval of the plurality of time intervals is below a desired level of performance, such as a performance threshold. The computing device may further receive a distribution of wireless traffic associated with the at least one client device during the plurality of time intervals. The computing device may use the distribution of wireless traffic to determine at least one time interval associated with a level of wireless traffic that is greater than or equal to a mean level of wireless traffic for the plurality of time intervals. The at least one time interval associated with the level of wireless traffic that is greater than or equal to the mean level of wireless traffic may correspond to the at least one time interval associated with the first value for the performance metric (e.g., a same time of day, or a portion thereof).

The desired level of performance may relate to an expected mean level RSSI for at least one client device during the plurality of time intervals. The performance metric may not be met or exceeded when the mean RSSI for the at least one client device is determined to fall below the expected mean value. As another example, the desired level of performance may relate to an amount by which a level of RSSI for the at least one client device for a time interval during the day (e.g., an hour) deviates from the mean RSSI for the at least one client device throughout the day. When the level of RSSI for the at least one client device during the time interval deviates at least a specified number of standard deviations (e.g., 3) from the mean RSSI, the level of RSSI for that time interval may be considered an outlier and thus falling below (e.g., not meeting or exceeding) the performance threshold. As a further example, the desired level of performance may relate to a level of skewness of a distribution of values of the level of RSSI for the at least one client device during each of the plurality of time intervals. The level of skewness may be a measure of a symmetry of the distribution of the values of the level of RSSI for the at least one client device during each of the plurality of time intervals with respect to the mean RSSI for the at least one client device during the day. When the level of skewness is determined to be at least a specified level of skewness (e.g., less than −0.4 or greater than 0.4), the level of RSSI for that time interval may be considered to fall below (e.g., not meeting or exceeding) the performance threshold. The first value for the performance metric falling below the performance threshold may be determined by the computing device to be indicative of a high probability of poor RSSI.

At step 1308, the computing device may determine a recommendation for placement of a network device (e.g., an access point/wireless extender) at a location associated with the at least one client device and the at least one time interval. The recommendation may indicate an identifier for the at least one client device. The recommendation may also include an indication of a probability of poor reception experienced by the at least one client device during one or more intervals of the plurality of time intervals. For example, the computing device may use the first value for the performance metric to provide a prediction of whether the at least one client device will experience poor network performance at one or more of the time intervals. The prediction may range between 0 and 1. A value of '1' may indicate the at least one client device will likely experience poor overall network performance during a given time interval, while a value of '0' may indicate otherwise (e.g., the at least one client device will not likely experience poor overall network performance during the given time interval).

One or more steps of the method 1300 may incorporate one or more steps of the training process 900 to train a machine learning classifier. For example, the computing device may receive training network performance data for each of a plurality of training wireless networks. Each of the plurality of training wireless networks may include at least one training client device. The network performance data may indicate a number of training client devices in communication with each training wireless network and one or more performance metrics for one or more of the training client devices, such as a level of RSSI, a data reception rate, a data transmission rate, an amount of network traffic processed, a combination thereof, and/or the like. The training network performance data may associate each of the one or more performance metrics with a timestamp (e.g., date/time) and/or an interval of time (e.g., a minute, an hour, a day, etc.).

The computing device may determine a first training dataset for training the machine learning classifier. The first training dataset may be based on the training network performance data. The first training dataset may include the training network performance data for a first plurality of training wireless networks, which may be a subset of the plurality of training wireless networks. Each of the first plurality of training wireless networks may have only one access point device, such as a gateway device and a network device configured to extend a coverage area of the gateway device (e.g., a wireless extender), between a first time and a second time. Each of the first plurality of training wireless networks may have at least one static client device, such as a smart speaker or network-enabled device, and at least one mobile client device, such as a user device (e.g., laptop, tablet, mobile phone, etc.).

The computing device may determine a second training dataset for training the machine learning classifier. The second training dataset may be based on the training network performance data. The second training dataset may include the training network performance data for a second plurality of training wireless networks, which may be another subset of the plurality of training wireless networks. Each of the second plurality of training wireless networks may have one access point device, such as a gateway device, between the first time and the second time. Each of the second plurality of training wireless networks may have at least one static client device, such as a smart speaker or network-enabled device, and at least one mobile client device, such as a user device (e.g., laptop, tablet, mobile phone, etc.).

The computing device (e.g., the analytics engine 116) may use the first training dataset and the second training dataset to train the machine learning classifier. When training the classifier, the computing device may determine a level of RSSI for each of a plurality of time intervals for at least one training client device of a first network of the first training dataset. The computing device may determine a level of RSSI for each of the plurality of time intervals for at least one training client device of a second network of the second training dataset. The computing device may determine a desired level of performance, such as a performance threshold, using the determined levels of RSSI for each of the plurality of time intervals for the at least one training client device of the first network and the determined levels of RSSI for each of the plurality of time intervals for the at least one training client device of the second network.

The computing device may receive further network performance data associated with the at least one client device of the wireless network described in step 1302. The further network performance data may be associated with a second plurality of time intervals (e.g., separate plurality of time intervals). During the second plurality of time intervals, the wireless network may include the at least one client device, a first access point (e.g., a gateway device), and the network device associated with the recommendation (e.g., a second access point). The computing device may use the further network performance data to determine that a second value for the performance metric during at least one time interval of the second plurality of time intervals is above the performance threshold. The at least one time interval of the second plurality of time intervals may correspond to at least one time interval of the plurality of time intervals (e.g., a same time of a day, or a same portion thereof). The computing device may determine that the second value for the performance metric meets or exceeds the performance threshold.

Turning now to FIG. 14, an example method 1400 for managing a wireless network is shown. The method 1400 may be performed by the analytics engine 116 of FIG. 1. The computing device 107A, 107B, or 107C of FIG. 1 may be used to interact with the analytics engine 116 when implementing the method 1400. At step 1402, a computing device, such as the server 102, may receive first network performance data associated with at least one client device of a wireless network. The wireless network may include the at least one client device and a first access point (e.g., a gateway device). The at least one client device may be a mobile client device, such as a user device (e.g., laptop, tablet, mobile phone, etc.).

One or more steps of the training process 900 may be used by the computing device to train a classifier (e.g., a machine learning classifier). For example, the computing device may receive training network performance data for each of a plurality of training wireless networks. Each of the plurality of training wireless networks may include at least one training client device. The training network performance data may indicate a number of training client devices in communication with each training wireless network and one or more performance metrics for one or more of the training client devices, such as a level of RSSI, a data reception rate, a data transmission rate, an amount of network traffic processed, a combination thereof, and/or the like. The training network performance data may associate each of the one or more performance metrics with a timestamp (e.g., date/time) and/or an interval of time (e.g., a minute, an hour, a day, etc.).

The computing device may determine a first training dataset for training the machine learning classifier. The first training dataset may be based on the training network performance data. The first training dataset may include the training network performance data for a first plurality of training wireless networks, which may be a subset of the plurality of training wireless networks. Each of the first plurality of training wireless networks may have at least two access point devices, such as a gateway device and a network device configured to extend a coverage area of the gateway device (e.g., a wireless extender). Each of the first plurality of training wireless networks may have at least one static client device, such as a smart speaker or network-enabled device, and at least one mobile client device, such as a user device (e.g., laptop, tablet, mobile phone, etc.).

The computing device may determine a second training dataset for training the machine learning classifier. The second training dataset may be based on the training network performance data. The second training dataset may include the training network performance data for a second plurality of training wireless networks, which may be another subset of the plurality of training wireless networks. Each of the second plurality of training wireless networks may have one access point device, such as a gateway device. Each of the second plurality of training wireless networks may have at least one static client device, such as a smart speaker or network-enabled device, and at least one mobile client device, such as a user device (e.g., laptop, tablet, mobile phone, etc.). The computing device (e.g., the analytics engine 116) may use the first training dataset and the second training dataset to train the machine learning classifier.

At step 1404, the computing device may use the trained classifier to determine that a first value for a performance metric during at least one time interval of a plurality of time intervals is below a desired level of performance, such as a performance threshold. The first value for the performance metric may be determined by the computing device using the trained classifier and the first network performance data. The performance metric may relate to a level of RSSI for each of the plurality of time intervals for the at least one client device. The desired level of performance may relate to an expected mean level RSSI for the at least one client device during each of the plurality of time intervals. The performance metric may not be met or exceeded when the mean RSSI for the at least one client device is determined to fall below the expected mean value. As another example, the desired level of performance may relate to an amount by which a level of RSSI for the at least one client device for a time interval (e.g., an hour) deviates from the mean RSSI for the at least one client device throughout the plurality of time intervals (e.g., a day). When the level of RSSI for the at least one client device during the time interval deviates at least a specified number of standard deviations (e.g., 3) from the mean RSSI, the level of RSSI for that time interval may be considered an outlier and thus falling below (e.g., not meeting or exceeding) the performance threshold. As a further example, the desired level of performance may relate to a level of skewness of a distribution of values of the level of RSSI for the at least one client device during each of the plurality of time intervals. The level of skewness may be a measure of a symmetry of the distribution of the values of the level of RSSI for the at least one client device during each of the plurality of time intervals with respect to the mean RSSI for the at least one client device throughout the plurality of time intervals. When the level of skewness is determined to be at least a specified level of skewness (e.g., less than −0.4 or greater than 0.4), the level of RSSI for that time interval may be considered to fall below (e.g., not meeting or exceeding) the performance threshold.

At step 1406, the computing device may send a recommendation for placement of a network device at a location associated with the at least one client device and the at least one time interval. The recommendation may be sent to an interface of a user device, such as the computing device 107A, 107B, or 107C. The computing device may sent the recommendation based on the first value of the performance metric being below the performance threshold. The network device may be an access point, a wireless extender, and the like, which may be placed at a location associated with the at least one client device and the at least one time interval. The recommendation may indicate an identifier for the at least one client device. The recommendation may also include an indication of a probability of poor reception experienced by the at least one client device during one or more intervals of plurality of time intervals.

At step 1408, the computing device may receive second network performance data associated with the at least one client device. The second network performance data may be associated with a second plurality of time intervals (e.g., separate from the plurality of time intervals). During the second plurality of time intervals, the wireless network may include the at least one client device, the first access point, and the network device associated with the recommendation (e.g., second access point). The computing device may use the second network performance data to determine that a second value for the performance metric during at least one time interval of the second plurality of time intervals is above the performance threshold. The at least one time interval of the second plurality of time intervals may correspond to at least one time interval of the plurality of time intervals (e.g., a same time of a day, or a same portion thereof). At step 1310, the computing device may determine that a second value for the performance metric during the at least one time interval of the plurality of time intervals falls below the threshold. The second value for the performance metric may be based on the second network performance data.

Figure 15:
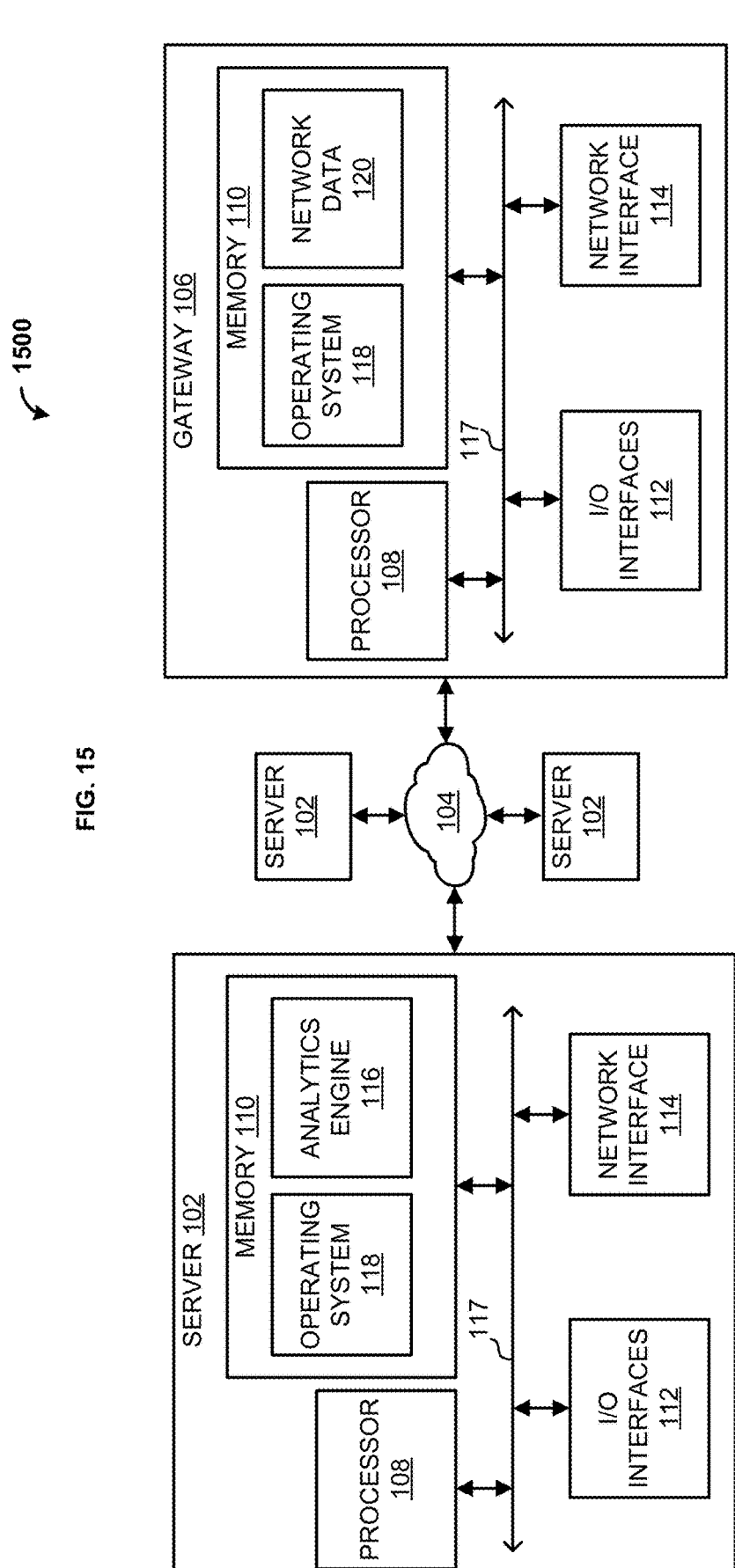
FIG. 15 shows a block diagram of an example system.

Turning now to FIG. 15, a block diagram of an example system 1500 for managing network a wireless network is shown. The system 1500 may include one or more of the devices/entities shown in FIG. 1 with respect to the system 100. For example, the system 1500 may include the server 102 and a gateway 106, such as the gateway device 106A, 106B, or 106C, in communication via the network 104. The server 102 may include one or more computers each configured to store one or more of the analytics engine 116, an operating system 118, and/or the like. The gateway 106 may include a memory 100 storing network data 120 (e.g., network performance data). Multiple gateways 106 may be in communication with the server(s) 102 through the network 104 such as, for example, the Internet.

The server 102 and the gateway 106 may each be a computer that, in terms of hardware architecture, may each include a processor 108, a memory 110, an input/output (I/O) interface 114, and/or a network interface 114. These may be communicatively coupled via a local interface 117. The local interface 117 may be one or more buses or other wired or wireless connections, as is known in the art. The local interface 117 may have additional elements, which are omitted for simplicity, such as controllers, buffers (caches), drivers, repeaters, and/or receivers, to enable communications. Further, the local interface 117 may include address, control, and/or data connections to enable appropriate communications among the aforementioned components.

Each processor 108 may be a hardware device for executing software, such as software stored in the corresponding memory 110. Each processor 108 may be any custom-made or commercially available processor, a central processing unit (CPU), an auxiliary processor among several processors associated with the server 102 and the gateway 106, a semiconductor-based microprocessor (in the form of a microchip or chip set), and/or generally any device for executing software instructions. When the server 102 and/or the gateway 106 are in operation, each processor 108 may be configured to execute software stored within the corresponding memory 110, to communicate data to and from the corresponding memory 110, and to generally control operations of the server 102 and/or the gateway 106 pursuant to the software.

The I/O interfaces 112 may be used to receive user input from and/or for providing system output to one or more devices or components. User input may be provided via, for example, a keyboard and/or a mouse. System output may be provided via a display device and a printer (not shown). The I/O interfaces 112 may include, for example, a serial port, a parallel port, a Small Computer System Interface (SCSI), an IR interface, an RF interface, a universal serial bus (USB) interface, and/or the like.

The network interfaces 114 may be used to transmit and receive from an external device, such as the server 102 or the gateway 106 on the network 104. The network interfaces 114 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interfaces 114 may include address, control, and/or data connections to enable appropriate communications on the network 104.

The memory 110 may include any one or combination of volatile memory elements (e.g., random access memory (RAM, such as DRAM, SRAM, SDRAM, etc.)) and non-volatile memory elements (e.g., ROM, hard drive, tape, CDROM, DVDROM, etc.). Moreover, the memory system 110 may incorporate electronic, magnetic, optical, and/or other types of storage media. Note that the memory system 110 may have a distributed architecture, where various components are situated remote from one another, but may be accessed by the processor 108.

The software stored the in memory 110 may include one or more software programs, each of which may include an ordered listing of executable instructions for implementing logical functions. For example, as shown in FIG. 14, the software in the memory 110 of the server 102 may include the analytics engine 116 and the operating system (O/S) 118. As also shown in FIG. 14, the software in the memory 110 of the gateway 106 may include the network data 120 and the operating system (O/S) 118. Each operating system 118 may control execution of other computer programs, such as the analytics engine 116 of the server 102. Each operating system 118 may provide scheduling, input-output control, file and data management, memory management, and/or communication control and related services.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:

receiving, by a computing device, network performance data associated with a plurality of wireless networks for a first time period and a second time period;

determining, based on the network performance data, a first training dataset comprising network performance data for a first plurality of wireless networks for the first time period and the second time period, wherein each of the first plurality of wireless networks is provided by one access point device during the first time period and at least two access point devices during the second time period;

determining, based on the network performance data, a second training dataset comprising network performance data for a second plurality of wireless networks for the first time period and the second time period, wherein each of the second plurality of wireless networks is provided by one access point device during each of the first time period and the second time period;

training a machine learning model using the first training dataset and the second training dataset;

determining, based network performance data associated with at least one client device of a wireless network, a performance metric for the at least one client device during each of a plurality of time intervals;

determining, by the machine learning model, that a value for the performance metric during at least one time interval of the plurality of time intervals is below a desired level of performance; and determining, based on the value being below the desired level of performance, a recommendation for placement of a network device at a location associated with the at least one client device.

2. The method of claim 1, wherein each of the plurality of wireless networks comprises at least one client device, and wherein the network performance data comprises one or more of an indication of a number of client devices, a received signal strength for at least one client device, a data reception rate for at least one client device, a data transmission rate for at least one client device, or an amount of network traffic for at least one client device.

3. The method of claim 2, wherein training the machine learning model using the first training dataset and the second training dataset comprises:

determining, for at least one client device of a first network of the first training dataset, a received signal strength for each of a first plurality of time intervals during the first time period and for each of a second plurality of time intervals during the second time period;

determining, based on the received signal strength for the at least one client device of the first network during the first plurality of time intervals, that the received signal strength meets or exceeds a desired level of performance; and determining that the received signal strength for the at least one client device of the first network during the second plurality of time intervals falls below the desired level of performance.

4. The method of claim 3, wherein the desired level of performance comprises one or more of a standard deviation, a skewness, or a mean received signal strength.

5. The method of claim 1, wherein each of the first plurality of wireless networks and the second plurality of wireless networks comprises at least one static client device and at least one mobile client device.

6. The method of claim 1, further comprising: receiving, by the computing device, the network performance data associated with the at least one client device of the wireless network.

7. The method of claim 1, further comprising:

receiving, by the computing device, based on the placement of the network device at the location, second network performance data associated with the at least one client device of the wireless network; and determining, by the machine learning model, based on the second network performance data, a second value for the performance metric during the at least one time interval of the plurality of time intervals falls below the desired level of performance.

8. A method comprising:

receiving, by a computing device, network performance data associated with at least one client device of a wireless network;

determining, based on the network performance data, a performance metric for the at least one client device during each of a plurality of time intervals;

determining, by a machine learning model, that a value for the performance metric during at least one time interval of the plurality of time intervals is below a desired level of performance, wherein the machine learning model is trained based on a first training dataset comprising network performance data for wireless networks provided by one access point device during a first time period and at least two access point devices during a second time period and a second training dataset comprising network performance data for wireless networks provided by one access point during each of the first time period and the second time period; and determining, based on the value being below the desired level of performance, a recommendation for placement of a network device at a location associated with the at least one client device and the at least one time interval.

9. The method of claim 8, wherein the performance metric comprise a received signal strength for the at least one client device during each of the plurality of time intervals.

10. The method of claim 9, wherein the desired level of performance comprises one or more of a standard deviation, a skewness, or a mean received signal strength associated for the at least one client device, and wherein determining that the value for the performance metric during the at least one time interval of the plurality of time intervals is below the desired level of performance comprises:

determining at least one time interval of the plurality of time intervals associated with at least one outlier value for one or more of the standard deviation, the skewness, or the mean received signal strength associated with the at least one client device; and determining that the at least one outlier value is below a performance threshold, wherein the at least one outlier value being below the performance threshold is indicative of a high probability of poor received signal strength.

11. The method of claim 8, wherein the network device is a wireless network range extender.

12. The method of claim 8, further comprising:

determining, based on a distribution of wireless traffic associated with the at least one client device during the plurality of time intervals, at least one time interval associated with a level of wireless traffic that is greater than or equal to a mean level of wireless traffic for the plurality of time intervals.

13. The method of claim 8, further comprising:

receiving, by the computing device, the network performance data associated with a plurality of wireless networks for the first time period and the second time period.

14. The method of claim 8, further comprising:

receiving, by the computing device, based on the placement of the network device at the location, second network performance data associated with the at least one client device of the wireless network; and determining, by the machine learning model, based on the second network performance data, a second value for the performance metric during the at least one time interval of the plurality of time intervals falls below the desired level of performance.

15. A method comprising:

receiving, by a computing device, first network performance data associated with at least one client device of a wireless network;

determining, by a machine learning model, based on the first network performance data, a first value for a performance metric during at least one time interval of a plurality of time intervals is below a desired level of performance, wherein the machine learning model is trained based on a first training dataset comprising network performance data for wireless networks provided by one access point device during a first time period and at least two access point devices during a second time period and a second training dataset comprising network performance data for wireless networks provided by one access point during each of the first time period and the second time period;

sending, based on the first value being below the desired level of performance, a recommendation for placement of a network device at a location associated with the at least one client device and the at least one time interval;

receiving, by the computing device, based on the placement of the network device at the location, second network performance data associated with the at least one client device of the wireless network; and determining, by the machine learning model, based on the second network performance data, a second value for the performance metric during the at least one time interval of the plurality of time intervals falls below the desired level of performance.

16. The method of claim 15, wherein the performance metric comprises a received signal strength for the at least one client device during each of the plurality of time intervals.

17. The method of claim 16, wherein the desired level of performance comprises one or more of a standard deviation, a skewness, or a mean received signal strength associated with the at least one client device.

18. The method of claim 17, wherein determining that the first value for the performance metric during the at least one time interval of the plurality of time intervals is below the desired level of performance comprises:

determining at least one time interval of the plurality of time intervals associated with at least one outlier value for one or more of the standard deviation, the skewness, or the mean received signal strength associated for the at least one client device; and determining that the at least one outlier value is below a performance threshold, wherein the at least one outlier value being below the performance threshold is indicative of a high probability of poor received signal strength.

19. The method of claim 15, wherein the network device is a wireless network range extender.

20. The method of claim 15, further comprising:

receiving, by the computing device, the network performance data associated with a plurality of wireless networks for the first time period and the second time period.

* * * * *